United States Patent
Hed et al.

(10) Patent No.: US 10,954,395 B2
(45) Date of Patent: Mar. 23, 2021

(54) ANTIFOULING COMPOSITION

(71) Applicant: JOTUN A/S, Sandefjord (NO)

(72) Inventors: Kim Öberg Hed, Porsgrunn (NO); Marit Seim, Langesund (NO); Michael Fiedel, Essen (DE); Petra Allef, Essen (DE); Georg Schick, Krefeld (DE); Prasad Vishwa Aitha, Essen (DE); Tim-Frederic Sloot, Haltern am See (DE)

(73) Assignee: JOTUN A/S, Sandefjord (NO)

( * ) Notice: Subject to any disclaimer, the term of this patent is extended or adjusted under 35 U.S.C. 154(b) by 102 days.

(21) Appl. No.: 15/744,095

(22) PCT Filed: Jul. 11, 2016

(86) PCT No.: PCT/EP2016/066451
§ 371 (c)(1),
(2) Date: Jan. 12, 2018

(87) PCT Pub. No.: WO2017/009297
PCT Pub. Date: Jan. 19, 2017

(65) Prior Publication Data
US 2018/0201795 A1 Jul. 19, 2018

(30) Foreign Application Priority Data
Jul. 13, 2015 (EP) .................................... 15176493

(51) Int. Cl.
| | | |
|---|---|---|
| *C08G 77/445* | (2006.01) | |
| *C09D 5/16* | (2006.01) | |
| *C09D 183/10* | (2006.01) | |
| *C08G 77/46* | (2006.01) | |
| *C09D 5/00* | (2006.01) | |
| *C09D 183/12* | (2006.01) | |
| *C09D 183/08* | (2006.01) | |
| *C08G 63/695* | (2006.01) | |
| *C08L 83/10* | (2006.01) | |
| *C09D 167/02* | (2006.01) | |
| *C08G 77/38* | (2006.01) | |
| *B05D 3/10* | (2006.01) | |
| *C08G 77/44* | (2006.01) | |
| *C08G 77/28* | (2006.01) | |

(52) U.S. Cl.
CPC ........... *C09D 5/1675* (2013.01); *B05D 3/108* (2013.01); *C08G 63/6956* (2013.01); *C08G 77/38* (2013.01); *C08G 77/44* (2013.01); *C08G 77/445* (2013.01); *C08G 77/46* (2013.01); *C08L 83/10* (2013.01); *C09D 5/00* (2013.01); *C09D 5/16* (2013.01); *C09D 167/02* (2013.01); *C09D 183/08* (2013.01); *C09D 183/10* (2013.01); *C09D 183/12* (2013.01); *C08G 77/28* (2013.01)

(58) Field of Classification Search
CPC .......................... C08G 77/445; C09D 5/1675
USPC .......................................................... 528/26
See application file for complete search history.

(56) References Cited

U.S. PATENT DOCUMENTS

| | | | | |
|---|---|---|---|---|
| 5,134,197 A * | 7/1992 | Yamamori | ........... | C08G 77/398 525/100 |
| 5,180,843 A * | 1/1993 | O'Lenick, Jr. | ......... | C08G 77/38 556/77 |
| 5,210,133 A * | 5/1993 | O'Lenick, Jr. | ......... | A61K 8/893 427/387 |
| 8,450,443 B2 * | 5/2013 | Williams | ............. | C09D 183/12 528/15 |
| 8,574,719 B2 * | 11/2013 | Davies | ................ | C09D 183/04 428/447 |
| 8,603,378 B2 | 12/2013 | Mueller | | |
| 9,115,242 B2 * | 8/2015 | Jaunky | ................. | C08G 18/289 |
| 9,249,314 B2 * | 2/2016 | Williams | ............. | C09D 183/12 |
| 2009/0030097 A1 | 1/2009 | Knott et al. | | |
| 2009/0075851 A1 | 3/2009 | Thum et al. | | |
| 2010/0137529 A1* | 6/2010 | Williams | ............. | C09D 183/12 525/474 |
| 2010/0183886 A1* | 7/2010 | Davies | ................ | C09D 5/1675 428/447 |

(Continued)

FOREIGN PATENT DOCUMENTS

| | | |
|---|---|---|
| CN | 1799811 B | 6/2014 |
| EP | 0100623 | 2/1984 |

(Continued)

OTHER PUBLICATIONS

Vora, Ankit et al: "Use of PDMS-functionalized unsaturated polyester for preparation of UV-curable coatings with modified surface properties", PMSE Preprints, 98, CODEN: PPMRA9; ISSN: 1550-6703, 2008, XP009191872, p. 820-p. 821. Database Caplus [Online] Chemical Abstracts Service, Columbus, Ohio, US; Mar. 7, 2008 (Mar. 27, 2008) Vora, Ankit et al: XPO02762377, retrieved from STN Database accession No. 2008:373922.

(Continued)

*Primary Examiner* — Margaret G Moore
(74) *Attorney, Agent, or Firm* — Meunier Carlin & Curfman LLC

(57) ABSTRACT

A binder for a marine coating composition comprising the reaction product of a polysiloxane unit A' and at least one second monomer B' that undergoes a polymerisation reaction with said polysiloxane unit A' so as to form a copolymer of structure -[ABAB]- wherein the backbone of said copolymer comprises a plurality of hydrolysable ester functional groups that will hydrolyse in the presence of seawater.

31 Claims, No Drawings

(56) References Cited

U.S. PATENT DOCUMENTS

| | | | | |
|---|---|---|---|---|
| 2010/0204399 | A1* | 8/2010 | Chisholm | C08G 77/385 524/588 |
| 2012/0296051 | A1 | 11/2012 | Huggins et al. | |
| 2013/0310464 | A1* | 11/2013 | Jaunky | C08G 18/672 514/772.1 |
| 2014/0170426 | A1* | 6/2014 | Thorlaksen | C09D 183/04 428/447 |
| 2015/0087773 | A1* | 3/2015 | Williams | C09D 183/12 524/588 |
| 2015/0291808 | A1 | 10/2015 | Oya et al. | |
| 2015/0299515 | A1 | 10/2015 | Tanino | |
| 2015/0337144 | A1 | 11/2015 | Maliverney et al. | |
| 2016/0024314 | A1* | 1/2016 | Olsen | C09D 5/1693 428/447 |
| 2016/0312041 | A1* | 10/2016 | Azemar | B63B 59/04 |

FOREIGN PATENT DOCUMENTS

| | | |
|---|---|---|
| EP | 0691362 | 1/1996 |
| FR | 2999980 | 6/2014 |
| JP | 06-220361 | 8/1994 |
| WO | 2002/074870 | 9/2002 |
| WO | 2004/085560 | 10/2004 |
| WO | 2008/132196 | 11/2008 |
| WO | 2011/076856 | 6/2011 |
| WO | 2013/000479 | 1/2013 |
| WO | 2014/077204 | 5/2014 |
| WO | 2014/077205 | 5/2014 |
| WO | 2015/082397 | 6/2015 |
| WO | 2017/009301 * | 1/2017 |

OTHER PUBLICATIONS

Azemar, et al., "Development of hybrid antifouling paints", Progress in Organic Coatings 87 (2015) 10-19.
Vora, Ankit et al: "Use of PDMS-functionalized unsaturated polyester for preparation of UV-curable coatings with modified surface properties", PMSE Preprints, 98, CODEN: PPMRA9; ISSN: 1550-6703, 2008, XP009191872, p. 820-p. 821. Database Caplus [Online] Chemical Abstracts Service, Columbus, Ohio, US; Mar. 7, 2008 (Mar. 7, 2008) Vora, Ankit et al: XPO02762377, retrieved from STN Database accession No. 2008:373922 abstract.
International Search Report and Written Opinion issued for International Application No. PCT/EP2016/066457, dated Oct. 14, 2016.
International Preliminary Report on Patentability issued for International Application No. PCT/EP2016/066457, dated Jan. 16, 2018.
International Search Report and Written Opinion issued for International Application No. PCT/EP2016/066451, dated Sep. 29, 2016.
International Preliminary Report on Patentability issued for International Application No. PCT/EP2016/066451, dated Jan. 16, 2018.

* cited by examiner

ANTIFOULING COMPOSITION

FIELD OF THE INVENTION

The present invention relates to marine antifouling coating compositions, more specifically to marine antifouling coating compositions comprising a particular binder and to the binder itself. The invention further relates to kits suitable for the preparation of the antifouling coating compositions and to surfaces coated with the antifouling coating compositions.

BACKGROUND

Surfaces that are submerged in seawater are subjected to fouling by marine organisms such as green and brown algae, barnacles, mussels, tube worms and the like. On marine constructions such as vessels, oil platforms, buoys, etc. such fouling is undesired and has economical consequences. The fouling may lead to biological degradation of the surface, increased load and accelerated corrosion. On vessels the fouling will increase the frictional resistance which will cause reduced speed and/or increased fuel consumption. It can also result in reduced manoeuvrability.

Also underwater structures, e.g. industrial plant, pipes and tanks for fresh water storage that are exposed to an aqueous environment, likes rivers, lakes, canals and swimming pools, have the similar problem caused by the attachment and growth of living organisms. This causes severe economic losses because of decreased possible operation time.

To prevent settlement and growth of marine organisms antifouling paints are used. These paints generally comprise a film-forming binder, together with different components such as pigments, fillers, solvents and biologically active substances.

The most successful antifouling coating system on the market until 2003 was a tributyltin (TBT) self-polishing copolymer system. The binder system for these antifouling coatings was a linear acrylic copolymer with tributyltin pendant groups. In seawater the polymer was gradually hydrolysed releasing tributyltin, which is an effective biocide. The remaining acrylic copolymer, now containing carboxylic acid groups, became sufficiently soluble or dispersible in seawater to be washed out or eroded away from the coating surface. This self-polishing effect provided a controlled release of the biologically active compounds in the coating resulting in excellent antifouling efficiency and smooth surfaces and hence reduced frictional resistance.

The IMO Convention "International Convention on the Control of Harmful Anti-fouling Systems on Ships" of 2001 prohibited the application of new TBT containing antifouling coatings from 2003 and TBT containing antifouling coatings are prohibited on ship hulls from 2008.

In recent years new antifouling coating systems have been developed and introduced as a consequence of the TBT ban. One broad group of biocidal antifouling coatings on the market today is the self-polishing antifouling coatings which mimic the TBT self-polishing copolymer coatings. Those antifouling coatings are based on (meth)acrylic copolymers having pendant hydrolysable groups without biocidal properties. The hydrolysis mechanism is the same as in the TBT containing copolymers. This gives the same controlled dissolution of the polymers and thereby the controlled release of antifouling compounds from the coating film, resulting in similar performance as the TBT containing antifouling coating systems. The most successful self-polishing antifouling systems today are based on silyl ester functional (meth) acrylic copolymers. These coating compositions are for example described in, EP 0 646 630, EP 0 802 243, EP 1 342 756, EP 1 479 737, EP 1 641 862, WO 00/77102, WO 03/070832 and WO 03/080747. The hydrolysable binder provides a continuous renewal of the coating film and efficient release of biocides at the coating surface, and thereby keeping the surface free of organisms.

The above mentioned antifouling coating systems degrade by hydrolysis of pendant groups on the polymer backbone, which results in a water erodable polymer. The hydrolysis of the pendant groups on the polymer backbone results in the formation of carboxylic acid salts which make the polymer hydrophilic and thereby erodable. A certain amount of hydrolysable groups are needed to get sufficient hydrophilicity and an erodable polymer after hydrolysis.

Another way of obtaining water erodable polymers is by introducing hydrolysable groups in the polymer backbone, resulting in degradation of the polymer structure, which gives erosion of the polymer film or coating film. Polyanhydrides are a class of polymers that degrade by backbone hydrolysis. The polyanhydrides are well documented for their surface degradation properties. Surface degradation is one of the most important factors for obtaining a successful antifouling coating. The use of specific aromatic polyanhydrides as binders in antifouling coating compositions is, for example, described in WO 2004/096927.

However, the anhydride group is extremely labile in the presence of moisture and it is therefore difficult to design a coating system based on polyanhydrides that exhibits a slow, controlled hydrolysis for use in antifouling coatings. Accordingly, the polyanhydrides used for antifouling coating compositions generally have a high content of aromatic units in order to control the hydrolysis.

In recent years, polyoxalates have emerged as a class of polymers that are well suited for use as binders in antifouling coatings. Backbone hydrolysis in these compounds is more controlled than for the polyanhydrides.

The use of self-polishing binders in which the polymer backbone hydrolyses in sea water makes it possible to obtain erodable cross-linked polymers and high molecular weight polymers.

An alternative to the anti-fouling coatings (which necessarily contain a biocide), are the so called fouling release coatings. These coatings have low surface tension and low modulus of elasticity and work by providing a "non-stick" surface to which sea organisms cannot stick or if they can stick are washed off by the motion of the water against the surface. Coatings are often based on polysiloxane/silicone/polydimethylsiloxane (PDMS) that generally have very low toxicity. There are disadvantages of the fouling release system. For example, when applied to boat hulls the accumulation of marine organisms is reduced but relatively high vessel speeds are needed to remove all fouling species. Thus, in some instances, it has been shown that for effective release from a hull that has been treated with such a polymer, it is necessary to sail with a speed of at least 14 knots.

Such "non-stick" coatings have however, not shown good resistance to soft fouling such as slime and algae over time. Adding biocides in combination with a hydrophilic modified PDMS oil to such PDMS coatings has been suggested to overcome this problem in WO2011/076856. WO2013/00479 relies on the same principles of addition of biocides, but here hydrophilic modified polysiloxane moieties are covalently bonded to the polysiloxane binder.

These mixed materials have found limited commercial success however, as diffusion of biocides to the surface is too fast at the start of the coating lifetime, and then diffusion stops as the coating ages. More recently, Azemar, in Progress in Organic coatings 87, 2015, 10-19 discusses hybrid coatings based on a triblock copolymer of polycaprolactone and PDMS. A PDMS block is co-polymerized with caprolactone to obtain polycaprolactone polymer blocks on each end of a PDMS block. The polymers therefore contain only one PDMS block with two polyester blocks formed from the caprolactone meaning that any hydrolysis occurs only at the end of the molecule and not in the centre of any chain. Poly(caprolactone units) cannot be used in the manufacture of a copolymer as we claim as it does not contain two identical functional groups.

In WO2004/085560 polysilylesters are disclosed formed by the reaction of a dicarboxylic acid and an acyloxysilyl compound. The resulting polymer is suggested for use as a binder in anti-fouling coatings. The claimed polymer always contains a characteristic silyl-ester Si—O—CO— link in the backbone however. Silyl-esters are known to be very reactive towards moisture with complete degradation occurring within days or weeks. The compounds in '560 are much too labile to be used successfully in long term anti-fouling coating compositions which need to be in service for years. We also observe that the process for the manufacture of these silyl ester polymers is complex. Our solution uses a much simpler process and avoids problems associated with distillation of acids, for example.

In WO2015/082397, a coating composition is taught which contains a binder formed from the reaction of a polysiloxane and a lactone. This gives rise to a polymer chain containing a —CO-alkylene-O— group. This is achieved via the ring opening of a lactone. Moreover, this polymerisation results in a block copolymer as the ring opened lactone can react with other lactones to extend the polymerisation. The polymer is therefore a triblock polymer of structure AAABBBAAA. In order to obtain a curable polymer relatively high organic-to-siloxane ratios are necessary. This process leads to polymers which have much higher glass transitions compared to conventional polysiloxanes. This limits the non-stick character, softness and release potential of the polymers.

There remain problems to be solved, in particular, with regard to fouling release coating performance over time.

The present inventors have appreciated that it would be beneficial to have a fouling release coating surface that is renewable. The use of a renewable surface means that slime/algae and other soft fouling are physically removed with or without the need for biocides. It would therefore be useful if the fouling release coating composition could offer a renewable surface like that of an anti-fouling coating composition. This can be achieved with or without the addition of biocides. Biocides might be employed for example where a substrate, such as a ship's hull might be exposed to low speed or heavy fouling conditions.

The object of the present invention is to provide a new binder for a coating composition that can prevent marine organisms, both animals such as barnacles and algae/slime, adhering to the surface of underwater structures such as ship hulls. The idea of the invention is to combine the benefits of the fouling release type coating and the self-polishing anti-fouling coating, to provide, inter alia, a renewable non-stick surface on a substrate. The binder may or may not be provided with a biocide to potentially prolong the anti-fouling effect of the coating.

The invention therefore combines the benefits of the two technologies to provide a renewable coating with low surface tension optionally with biocides.

The invention achieves this aim using a copolymer made by polymerising polysiloxane units with shorter comonomer molecules which are not polysiloxanes to provide a polymer containing hydrolysable ester units in its backbone. Alternatively, the invention envisages the combination of two (different) polysiloxane reactants that combine together to generate a hydrolysable ester linkage there between.

The inventors have surprisingly found that the polymers designed herein are able to hydrolyse in sea water to renew the surface and, if desired allow leaching of any biocide within the coating. Also, the binders of the invention provide a coating composition that has low VOC, low surface energy and low modulus of elasticity.

SUMMARY OF THE INVENTION

Thus, viewed from one aspect the invention provides a binder for a marine coating composition, wherein said binder is an ABAB type polysiloxane copolymer comprising a plurality of units of formula

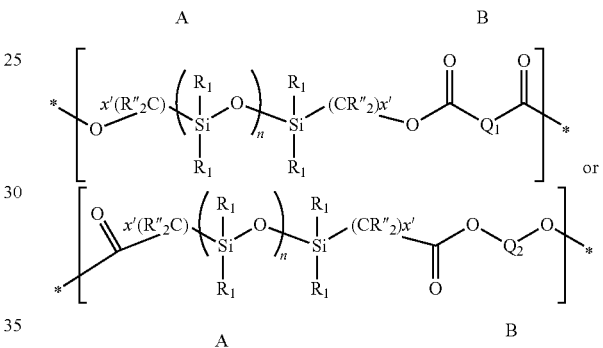

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

R" may independently be $C_{1-6}$ alkyl or H, especially H;

x' is 1 to 10, such as 1 to 5, especially 2 to 5, especially 3 to 5; and n is 1-500, more preferably 10-300, especially 15-100; and where Q1 is an aliphatic, cycloalkyl, cycloalkenyl or aromatic group having up to 20 carbon atoms, or a covalent bond; and Q2 is an aliphatic, cycloalkyl, cycloalkenyl, polyoxyalkylene or aromatic group having up to 20 carbon atoms.

Viewed from another aspect the invention provides a binder for a marine coating composition comprising the reaction product of at least one polysiloxane of general formula (A'):

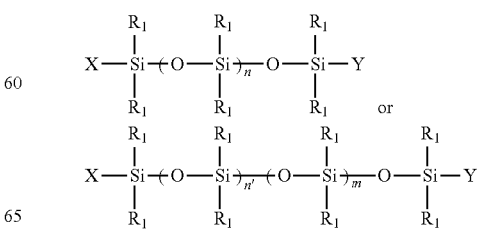

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y can be the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$—OH;

R" may independently be $C_{1-6}$ alkyl or H, especially H;

x' is 1 to 10, such as 1 to 5, especially 2 to 5, especially 3 to 5;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500, more preferably 10-300, especially 15-100;

or n'+m add to 1-500, more preferably 10-300, especially 15-100;

and at least one second monomer B' of formula

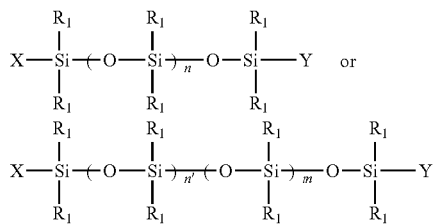

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y can be the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$—OH;

R" may independently be $C_{1-6}$ alkyl or H, especially H;

x' is 1 to 10, such as 1 to 5, especially 2 to 5, especially 3 to 5;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500, more preferably 10-300, especially 15-100;

or n'+m add to 1-500, more preferably 10-300, especially 15-100;

with the proviso that the X and Y groups in monomer B' are selected to react with the X and Y groups in monomer A' to form a ester group.

These monomers undergo a polymerisation reaction to form a copolymer of structure -[ABAB]-.

It is preferred if X and Y can be the same or different and represent $(CH_2)_{x'}$—OH, $(CH_2)_x$COOH, $(CH_2)_x$COOR, or —$(CH_2)_{x'}$—$(OR^{11})_a$—$(OR^{11})_b$—OH. X and Y are ideally the same.

Viewed from another aspect the invention provides a binder for a marine coating composition comprising the reaction product of at least one polysiloxane of general formula (A')

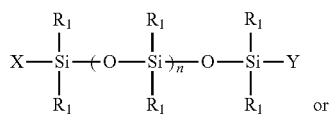

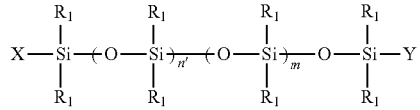

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y can be the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$—OH;

R" may independently be C1-6 alkyl or H, especially H;

x' is 1 to 10, such as 1 to 5, especially 2 to 5, especially 3 to 5;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500, more preferably 10-300, especially 15-100;

or n'+m add to 1-500, more preferably 10-300, especially 15-100;

and (i) at least one second monomer B' of formula

W-Q-Z wherein W and Z are each independently RcOOC, RcO-COO—, RcCOOCO—, —COOH, Hal-CO, or OH;

where Q is an aliphatic, cycloalkyl, cycloalkenyl, polyoxyalkylene, amine ether or aromatic group having up to 20 carbon atoms, or Q is O or a covalent bond and each Rc is the same or different and represents halo, H, $C_{1-20}$ alkyl, $C_{2-20}$ alkenyl, $C_{6-20}$ aryl, $C_{3-20}$-cycloalkyl or $C_{7-20}$ arylalkyl group;

with the proviso that the W and Z groups in monomer B' are selected to react with the X and Y groups in monomer A' to form a ester group;

or (ii) at least one second monomer B' which is a cyclic anydride which reacts with the X and Y groups in monomer A' to form an ester.

Both Rc groups are preferably the same.

Viewed from another aspect the invention provides a binder for a marine coating composition comprising the reaction product of at least one polysiloxane of general formula (A'):

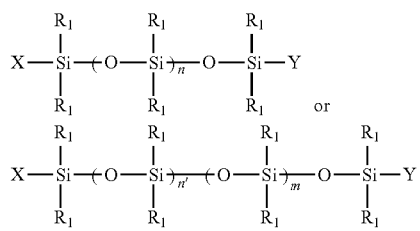

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y can be the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$—OH;

R" may independently be C1-6 alkyl or H, especially H;

x' is 1 to 10, such as 1 to 5, especially 2 to 5, especially 3 to 5;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500, more preferably 10-300, especially 15-100;

or n'+m add to 1-500, more preferably 10-300, especially 15-100;

and at least one second monomer B' which is a dicarboxylic acid or dicarboxylic acid derivative (such as an ester, cyclic anhydride or acid halide), or a diol wherein the resulting polymer is of structure-[ABAB]- and with the proviso that the X and Y groups in monomer A' react with monomer B' to form ester groups in the polymer backbone.

Viewed from another aspect the invention provides a fouling release coating composition comprising a binder as hereinbefore defined and at least one of filler, pigment, solvent, additive, curing agent and catalyst, preferably in the absence of a biocide.

Viewed from another aspect the invention provides an anti-fouling coating composition comprising a binder as hereinbefore defined and at least one anti-fouling agent.

Viewed from another aspect the invention provides a process for protecting an object from fouling comprising coating at least a part of said object which is subject to fouling with a coating composition as hereinbefore described and preferably curing the composition.

Viewed from another aspect the invention provides an object coated with a coating composition as hereinbefore defined, preferably a cured composition.

Viewed from another aspect the invention provides a process for the preparation of a binder for a marine coating composition comprising copolymerising a polysiloxane unit A' and at least one second monomer B' so as to form an -ABAB- copolymer in which hydrolysable ester functional groups are present in the backbone of the copolymer.

Viewed from another aspect the invention provides use of a binder as hereinbefore defined for use in a fouling release composition or a marine anti-fouling coating composition.

Definitions

The terms biocide and anti-fouling agent are used interchangeably herein and are defined below.

It will be appreciated that second monomer B' is necessarily different from polysiloxane unit A'. Even if monomer B' is itself a polysiloxane it must be different from polysiloxane unit A' in order to allow a copolymerisation reaction to occur.

The binder of the invention contains multiple ester hydrolysable groups in the backbone of the molecule. The ester hydrolysable functional group is a group that undergoes hydrolysis in seawater. The polymer should preferably contain a plurality of hydrolysable ester groups in the backbone of the polymer, such as 3 or more. Other hydrolysable groups might also be present.

The ester hydrolysable group is ideally of formula —[Si—(CH$_2$)x'—O—CO—]- or —[Si—(CH$_2$)x'—CO—O]—.

It will be understood that the hydrolysis reaction is one whose rate is highly dependent on both the chemical structure/composition of a compound/binder as well as the surrounding environmental conditions (salinity, pH, temperature, moisture content, etc.). The hydrolysable group should be one which hydrolyses at a temperature of 0-35° C., and at a pH and salinity reflective of natural sea water.

The ester "hydrolysable group" should be one that undergoes a hydrolysis reaction at a rate sufficient as to cause a coating surface polishing effect when said surface is moving through sea water, i.e. undergo hydrolysis in sea water at a temperature range of 0-35° C., and at a pH and salinity reflective of natural sea water.

As well as the ester hydrolysable groups, other groups that might be present include acetal, hemiacetal, ketal, carbamate, and carbonate and groups such as silyl ethers.

For the avoidance of doubt, ethers, thioethers, amides and amines are not considered sufficiently hydrolysable in this respect. The siloxane group is not considered sufficiently hydrolysable.

Hydrolysable groups need to be present in the backbone of the polymer, i.e. not in a side chain off the main polymer chain. The hydrolysable groups repeat in the backbone. Whilst there may be hydrolysable groups in side chains of the polymer, hydrolysable groups must be present in the backbone of the polymer.

In order to be effective, the hydrolysable groups should be spread throughout the polymer molecule, rather than located only at the ends of the molecule for example.

The copolymer of the invention is preferably not a block copolymer in which there are blocks of siloxane and end blocks of another material such as a polyester, i.e. a polymer of structure AAAABBBBBBAAAA. Rather, the copolymer of the invention is of structure -[ABAB]-, with at least two repeating units of monomer A' and at least two repeating units of monomer B'. It will be appreciated that there can be many repeating units and the formula -[ABAB]- is intended to encompass copolymers with any number of AB repeating units. We define molecular weights below.

The monomers A' and B' react together to form polymer repeating units A and B.

The term amine ether refers to the structure alkylene-NR$_{20}$-alkylene, such as $C_{1-6}$-alkylene-NH—$C_{1-6}$ alkylene. $R_{20}$ may be $C_{1-6}$ alkyl or H.

In any embodiment of the invention, alkyl or alkylene groups are preferably linear.

Both n' and m have values of 0 to 500 such as n'+m add to 1-500, more preferably 10-300, especially 15-100.

In any embodiment the subscripts a, b or the total of a+b is preferably 1 to 10.

DETAILED DESCRIPTION

This invention relates to a new binder that can be used in a fouling release coating composition or an anti-fouling coating composition. The fouling release composition is preferably free of anti-fouling agent and is formed from a coating composition comprising the binder of the invention, ideally via crosslinking of that composition. The term anti-fouling coating composition refers to a composition comprising the binder of the invention and at least one marine anti-fouling agent. The fact that the binder contains hydrolysable groups makes the binder ideal for use in either type of coating. The slow hydrolysis also allows regeneration of the coating surface. This regeneration effectively deals with the issue of algae/slime formation on a fouling release coating composition. The hydrolysis reaction allows controlled release of the anti-fouling agent in an anti-fouling coating.

We use the term coating composition below to refer to either anti-fouling or fouling release coating compositions.

The term binder is a term of this art. The binder is the actual film forming component of the coating composition. The coating composition comprises the binder as well as other components as discussed in detail below. The binder imparts adhesion and binds the components of the coating composition together.

Polysiloxane Component A'

The polymer binder of the invention is made up from multiple monomers, e.g. at least two monomers. There is at least one polysiloxane unit A' (which may be considered a polysiloxane monomer) and at least one other monomer unit (called the second monomer herein) B', that reacts with the polysiloxane unit A' to generate a copolymer with a plurality of ester hydrolysable linkages in the polymer backbone. The polymer backbone is ideally one that contains the linker —[Si—(CH$_2$)x'—O—CO—]- or —[Si—(CH$_2$)x'—CO—O]— where x' is as defined below.

The polymer is of the type -ABABA- because it is formed by condensation polymerisation and is not a block copolymer of the type AAABBBBBBAAA. It is the ester hydrolysable linkages that hydrolyse over time in seawater and allow regeneration of the surface of a fouling release coating and allow renewal and leaching of the biocide present in the anti-fouling composition of the invention. In WO2015082397, polysiloxane binders are prepared by the ring opening of a lactone. Where an ester link is generated by the ring opening of a lactone, the lactone opens to give an OH which can itself ring-open further lactone monomers. The resulting polymer therefore contains a siloxane monomer but can then be flanked by a series of lactone generated repeating units. Such a polymer is not therefore an ABAB polymer.

The backbone preferably contains the hydrolysable linkage —[Si—(CH$_2$)x'—O—CO—]— or —[Si—(CH$_2$)x'—CO—O]—. Other hydrolysable linkages may also be present. Hydrolysable links may be formed during an actual polymerisation reaction or they may be present within the backbone of the polymerising units before polymerisation and hence become part of the copolymer backbone during polymerisation. It is also possible for there to be hydrolysable groups formed during the copolymerisation as well as hydrolysable groups present within the monomer backbone and hence polymer backbone. In a preferred embodiment therefore monomer B' contains at least one hydrolysable group within the backbone of the monomer which will become part of the polymer backbone on copolymerisation with the polysiloxane.

In one embodiment therefore, the introduction of these hydrolysable groups relies on a reaction between the polysiloxane unit A' and the second monomer B' so as to generate the ester hydrolysable linkage. That reaction can be carried out in many ways depending on the end group on a polysiloxane and the end group on the second monomer. The chemistry involved in coupling the two reactants to form an ester is therefore broadly defined but chemically quite simple. The skilled person knows many ways of developing an ester linkage for example. It will be appreciated that the polysiloxane unit can act as the nucleophile or may act as the electrophile depending on the functional groups present. It may be easier to use the polysiloxane unit as a nucleophile but the invention could easily be adapted to place an electrophilic group at the end of the polysiloxane unit and allow attack on the polysiloxane unit by the second monomer. The polymerisation is preferably a condensation polymerisation or addition polymerisation but other types of polymerisation familiar to the skilled person can also be used.

In a second embodiment, the second monomer might contain one or more hydrolysable groups in its backbone that become part of the polymer backbone upon copolymerisation with the polysiloxane. Again, the invention provides a polymer with such a hydrolysable group. At the same time a hydrolysable link is developed between the A' and B' monomers on copolymerisation.

The crux of the invention is the appreciation that a valuable marine binder can be prepared by introducing hydrolysable linkages such as —[Si—(CH$_2$)x'—O—CO—]— into the backbone of a polysiloxane polymer and the skilled person is aware that there are many ways of introducing hydrolysable units.

The polysiloxane unit which is copolymerised to generate a binder of the invention is preferably of general formula (A'):

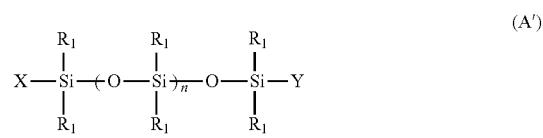

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y can be the same or different and represent $(CR''_2)_{x'}$—OH, $(CR''_2)_x$COOH, $(CR''_2)_x$COOR, or —$(CR''_2)_{x'}$—$(OR^{11})_a$—$(OR)_b$—OH;

R'' may independently be $C_{1-6}$ alkyl or H, especially H;

x' is 1 to 10, such as 1 to 5, especially 2 to 5, especially 3 to 5;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500, more preferably 10-300, especially 15-100.

It is preferred if X and Y can be the same or different and represent $(CH_2)_{x'}$—OH, $(CH_2)_x$COOH, $(CH_2)_x$COOR, or $(CH_2)_{x'}$—$(OR^{11})_a$—$(OR^{11})_b$—OH. It is preferred if X and Y are the same.

The term arylalkyl group is used herein to cover both benzyl type linkers (CH$_2$-Ph) where the bond to the Si is via the alkyl portion or methylphenyl type groups where the bond to the silicon is via the aryl group.

It is preferred if all $R_1$ groups are the same. It is preferred if $R_1$ is $C_{1-20}$ alkyl, $C_{2-20}$ alkenyl, $C_{6-20}$ aryl, $C_{7-20}$ arylalkyl. It is preferred if $R_1$ is unsubstituted. It is preferred if $R_1$ is a $C_{1-6}$ alkyl group such as ethyl or especially methyl. The use of a PDMS is therefore especially preferred. It is also possible however for at least one $R_1$ group to be a polyoxyalkylene chain. The molecule is likely to contain a plurality of these groups distributed across the polysiloxane backbone. The presence of such a chain enhances the hydrophilicity of the molecule. A suitable polyoxyalkylene chain may be one of formula:

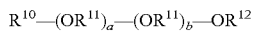

where $R^{10}$ and $R^{11}$ are each independently $C_{2-6}$ alkylene and $R^{12}$ is H, CH$_3$CO—, CH$_3$CH$_2$CO—, HCO—, or $C_{1-6}$alkyl and a=0-50, b=0-50 and a+b=1-50. It is preferred if $R^{12}$ is not H to avoid any reaction of the side chain. $R^{12}$ is preferably CH$_3$CO—, CH$_3$CH$_2$CO—, HCO—, or $C_{1-6}$alkyl, especially CH$_3$CO— or CH$_3$CH$_2$CO—, Thus, suitable materials include those selected from polyoxyethylene, polyoxypropylene and poly(oxyethylene-co-oxypropylene). A preferred polysiloxane monomer is polydimethylsiloxane (PDMS). It will be appreciated that the repeating unit —Si—O—Si— is not regarded as hydrolysable.

The end groups X and Y are preferably the same. It is preferred if all R groups are the same. It is preferred if R is a $C_{1-6}$ alkyl group such as ethyl or methyl.

It is preferred if all R" groups are the same. It is preferred if R" is H.

It is preferred if X and/or Y are a carbinol, i.e. an $(CH_2)_{x'}OH$ chain, or X and/or Y are $(CH_2)_{x'}COOH$ or $(CH_2)_{x'}COOR$. In this regard R is preferably $C_{1-6}$ alkyl. The subscript x' is preferably 1 to 10, such as 2 to 5 or 3 to 5.

The use of PDMS carbinol is a preferred option.

In a preferred option, the number average molecular weight (Mn) of the polysiloxane monomer A' may be at least 700, such as at least 1200, such as at least 2000. An upper limit of 40,000 such as 20,000, e.g. 17,000 is appropriate, such as at most 15,000.

In theory, a branched polysiloxane monomer could be used in which therefore there are more end groups than just X and Y identified in formula (A') above. The use of a branched structure allows the generation of a branched copolymer with the second monomer. It is believed however, that the use of a bifunctional polysiloxane containing essentially two reactive ends groups is preferred as such a monomer allows the generation of an essentially linear polymer. Any polymer of the invention will contain at least two residues derived from a polysiloxane unit.

A preferred polysiloxane is therefore of formula (A"):

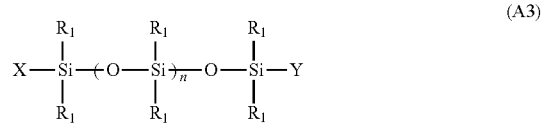

wherein each $R_1$ is methyl,

X and Y are the same and represent $(CH_2)_{x'}$—OH, —$(CH_2)_{x'}$—COOH, or —$(CH_2)_{x'}$—COOR; preferably $(CH_2)_{x'}$—OH, or —$(CH_2)_{x'}$—COOR;

x' is 1 to 10, especially 2 to 5, such as 3 to 5;

R is $C_{1-20}$ alkyl; and n is 10-300, especially 15-100.

A preferred polysiloxane is therefore of formula (A3):

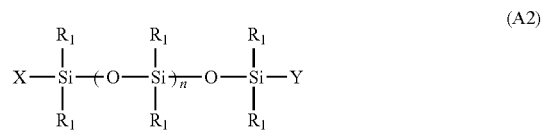

wherein each $R_1$ is methyl,

X and Y are the same and represent $(CH_2)_{x'}$—OH;

x' is 1 to 5; and n is 15-300.

A more preferred polysiloxane is therefore of formula (A2):

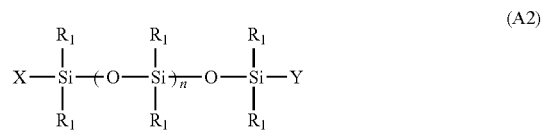

wherein each $R_1$ is methyl,

X and Y are the same and represent $(CH_2)_{x'}$—OH or —$(CH_2)_{x'}$—COOR;

x' is 1 to 5, especially 2 to 5, such as 3 to 5;

R is $C_{1-6}$ alkyl; and n is 10-300, especially 15-100.

Potential siloxane units that may be used include:

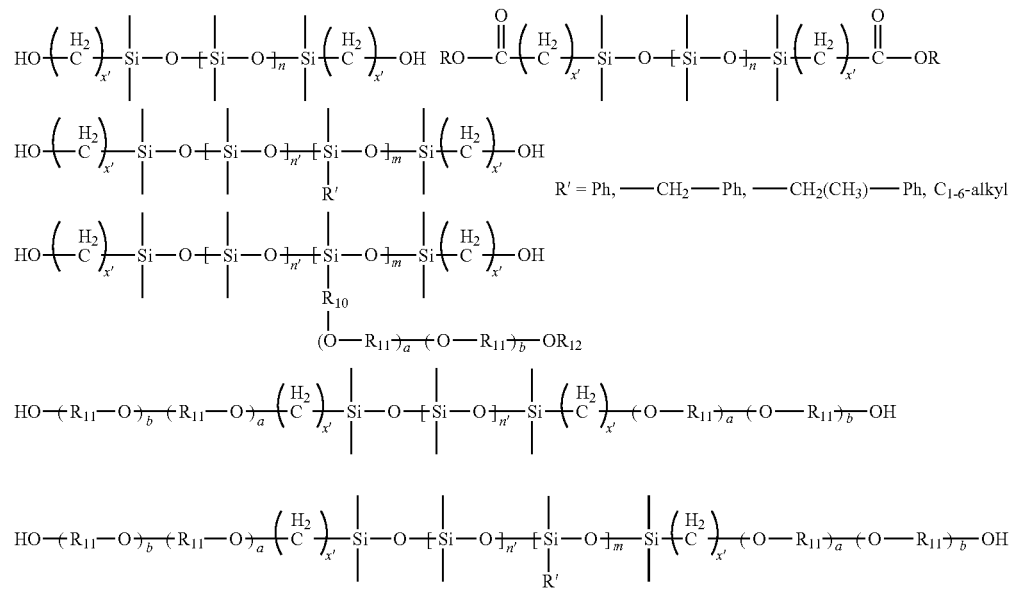

This is the second monomer. Hydrolysable ester groups are generated during the polymerisation reaction. In particular, the hydrolysable group present in the polysiloxane polymer of the invention is of formula —Si—(CH$_2$)x'—CO—O— or Si—(CH$_2$)x'—O—CO—. Preferably, the polymer of the invention comprises a plurality of groups of formula Si—(CH$_2$)x'—CO—O— or Si—(CH$_2$)x'—O—CO—.

It is preferred if the polysiloxane backbone in the polysiloxane of the invention is free from any groups of formula —Si—O—CO—. It is also preferred if the polysiloxane backbone in the polysiloxane of the invention is free of lactide links, i.e. —CO-alkyl-O— groups, such as —CO—C$_{1-3}$-alkyl-O—.

It is preferred to use a multifunctional second monomer in a condensation copolymerisation reaction with the polysiloxane unit. In such a condensation polymerisation reaction, the two "monomers" react to generate a copolymer having the structure -[ABAB]- in which an ester hydrolysable linkage is present between each A and B residues. In essence therefore the end group of the polysiloxane monomer reacts with the end group of the second monomer to generate an ester functional group that both links the two units and hydrolyses in sea water and therefore ensures that the binder of the invention is one that self polishes.

The second monomer is preferably therefore a diester, diacid or derivative thereof, or a second siloxane monomer with suitable end group functionality to react with monomer A'. It is possible to use a trifunctional or tetrafunctional second monomer (and so on) to create a branched structure if desired. It is however preferred, if the second monomer is bifunctional and therefore generates an essentially linear polymer. In a most preferred embodiment therefore, both polysiloxane unit and second monomer are bifunctional and therefore have two groups only that undergo copolymerisation.

It is possible to have a monomer with differing reactive groups, e.g. acid at one end and ester at another. It will be preferred that where different groups are present, both are nucleophiles or both are electrophiles. Variations of the chemistry here will be apparent to the person skilled in the art.

In one embodiment, the second monomer B' can itself be based on a polysiloxane that copolymerises with polysiloxane unit to form a copolymer in which the polysiloxane units are linked via ester hydrolysable groups. It will be appreciated therefore that the two monomer units must inherently be different in order to allow copolymerisation to occur. Thus, in one aspect the monomer B' is of formula

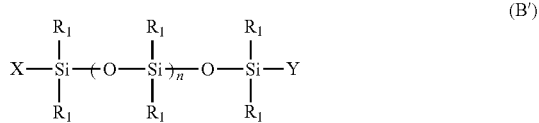

(B')

wherein each R$_1$ is the same or different and represents an unsubstituted or substituted C$_{1-20}$ alkyl, C$_{2-20}$ alkenyl, C$_{3-20}$ cycloalkyl, C$_{6-20}$ aryl, C$_{7-20}$ arylalkyl group, or a polyoxyalkylene chain;

X and Y can be the same or different and represent (CH$_2$)$_x$—OH, (CH$_2$)$_x$COOH, (CH$_2$)$_x$COOR, or (CH$_2$)$_x$—(OR$^{11}$)$_a$—(OR$^{11}$)$_b$—OH;

x' is 1 to 10, such as 1 to 5, especially 2 to 5, especially 3 to 5;

R is C$_{1-20}$ alkyl, C$_{2-20}$ alkenyl, C$_{6-20}$ aryl, C$_{7-20}$ arylalkyl group;

R$^{11}$ are each independently C$_{2-6}$ alkylene;

a=0-50, b=0-50 and a+b=1-50; and n is 1-500, more preferably 10-300, especially 15-100;

with the proviso that the X and Y groups in monomer B' are selected to react with the X and Y groups in monomer A to form a ester group.

In preferred options the monomer B' is as defined for A" or A2 with the proviso that the X and Y groups in monomer B' are selected to react with the X and Y groups in monomer A to form an ester group.

However, whilst the monomer units are different, in the final polymer the repeating units may appear the same. For example, if —(CH$_2$)x'—COOH-terminated PDMS is copolymerised with (CH$_2$)x'OH-terminated PDMS then the resulting polymer is PDMS with ester bonds binding the PDMS units together.

Where the second monomer is not a polysiloxane, the second monomer is preferably of lower molecular weight than the polysiloxane unit so that the majority, by weight, of the binder polymer is formed from the polysiloxane residues. It is therefore preferred if the number average Mn of the second monomer, when other than a polysiloxane is less than 2,000, such as less than 1,000, especially less than 500, such as less than 400.

In other embodiments, especially where the second monomer comprises a polysiloxane, the number average molecular weight (Mn) of the polysiloxane monomer B' may be at least 700, such as at least 1,200, such as at least 2,000. An upper limit of 40,000 such as 20,000, e.g. 17,000 is appropriate, such as at most 15,000.

The second monomer may have the general formula (B')

$$W\text{-}Q\text{-}Z \tag{B'}$$

where W and Z are the same or different and are functional groups that can react with the end groups X and Y on the polysiloxane monomer A' to form an ester hydrolysable group;

and Q is an aliphatic, cycloalkyl, cycloalkenyl, polyoxyalkylene, amine ether or aromatic group having up to 20 carbon atoms or Q is —O— or a covalent bond. The organic chemist will appreciate that the nature of the Q linker is dependent on the choice of W and Z groups. If W and Z are hydroxyl groups then obviously Q is neither covalent bond or O.

W and Z are preferably OH or comprise a carboxyl group such as a carboxylic acid or ester or acid halide.

The Mn of the W-Q-Z molecule is preferably less than 2000, such as less than 1000, especially less than 500, such as less than 300.

If Q is —O— then the monomer B' is preferably an anhydride. When the Q group is a covalent bond, the W-Z groups are bound directly to form a compound such as an oxalate. It is preferred if Q is alkylene or phenyl or polyoxyalkylene. The use of polyoxyalkylene is especially preferred where W and Z are hydroxyls.

If Q is a polyoxyalkylene it may have the structure

—R$^{10}$—(OR$^{11}$)$_a$—(OR$^{11}$)$_b$— where R$^{10}$ and R$^{11}$ are each independently C$_{2-6}$ alkylene and a=0-50, b=0-50 and a+b=1-50.

In theory, a branched monomer B' could be used in which therefore there are more end groups than just W and Z identified in formula (B') above. The use of a branched structure allows the generation of a branched copolymer with the first monomer. It is believed however, that the use of a bifunctional polysiloxane containing essentially two reactive ends groups is preferred as such a monomer allows the generation of an essentially linear polymer.

A branched monomer B might be a polyol structure comprising three of more hydroxyl groups, e.g. a monomer in which the Q linker has three available OH groups:

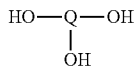

W and Z may represent an end group comprising a —COO group such as an ester Rc-OOC—, RcCOOCO— or —COOH or a group Hal-CO, where Rc represent a H, $C_{1-20}$ alkyl, $C_{2-20}$ alkenyl, $C_{6-20}$ aryl, $C_{3-20}$ cycloalkyl group or $C_{7-20}$ arylalkyl group. Disguised acids are therefore covered such as acid halides or anhydrides. The ester link is obtained via reaction of an acid/ester and an alcohol, e.g. via a transesterification or direct esterification process. There are many multifunctional ester monomers that could therefore be employed.

Suitable second monomers therefore include aliphatic dibasic acid esters such as dimethyl oxalate, dimethyl malonate, dimethyl succinate, dimethyl glutarate, dimethyl adipate, dimethyl pimelic acid, suberic acid dimethyl ester, dimethyl azelate, dimethyl sebacate, diethyl oxalate, diethyl malonate, diethyl succinate, diethyl glutarate, diethyl adipate, diethyl pimelic acid, diethyl suberic, azelaic or sebacic acid diethyl ester.

Suitable esters/acid might therefore be of formula

RcOOC-Q-COORc     (B2)

where Q is an aliphatic, cycloalkyl, cycloalkenyl or aromatic group having up to 20 carbon atoms or a covalent bond and each Rc is the same or different and represents H, C1-20 alkyl, C2-20 alkenyl, C6-20 aryl, $C_{3-20}$ cycloalkyl group or C7-20 arylalkyl group. Both Rc groups are preferably the same. Rc is preferably H, C1-6 alkyl and may be methyl or ethyl.

Preferably therefore, monomer B' is

RcOOC-Q-COORc     (B'')

where Q is a $C_{1-6}$-alkylene group (e.g. a linear $C_{1-6}$ alkylene group) or Q is a covalent bond and each Rc is the same or different and represents H or $C_{1-20}$ alkyl, e.g. Me or Et.

Such a monomer unit may have a Mn 100-2000, preferably 100-1000 especially 100-500. In general, the use of Rc=H, Me or Et is preferred.

A preferred option is a diester of a dicarboxylic acid, selected from diethyl oxalate, diethyl succinate, dimethyl succinate, dimethyl glutarate, diethyl glutarate, dimethyl adipate, and diethyl adipate, the mono- and dialkyl esters of said carboxylic acids with C1-C6-alcohols, eg. diethyl oxalate, diethyl succinate, diethyl esters, diethyl glutarate, monomethyl adipate, diethyl adipate, di-n-butyl adipate, monoethyl fumarate and dimethyl maleate.

If a suitable dicarboxylic acid can form an anhydride, it is also possible to use the anhydride of an at least dicarboxylic acid as component (a) for preparing the binder, e.g. maleic anhydride, phthalic anhydride or succinic anhydride. Particular preference for use as second monomer is terephthalic acid, phthalic acid and the dimethyl, diethyl, dipropyl and dibutyl esters of terephthalic acid, o-phthalic acid and m-phthalic acid. It is of course possible to use mixtures of different carboxylic acids or esters. Similarly, it is also possible in the condensation polymerisation to use for example mixtures of carboxylic acids and esters or mixtures of carboxylic acids and anhydrides.

Dialkenyl diesters are a further preferred option. Suitable dialkenyl diesters include diallyl phthalate, diallyl maleate, diallyl malonate, diallyl oxalate, diallyl glutarate, diallyl azenate, diallyl diglyconate, diallyl fumarate, diallyl malate, diallyl sebacate, dially suberate.

Examples of cyclic dicarboxylic acids include those of Formula B3 shown below:

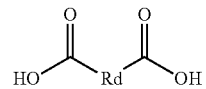

B3 wherein Rd is a saturated, unsaturated or aromatic $C_3$-$C_8$ ring, preferably a $C_5$-$C_6$ ring, optionally comprising one or more heteroatoms selected from the group consisting of N, O and S. Examples of heterocyclic rings include furan (e.g. giving the compound furan-2,5-dicarboxylic acid). It will be appreciated that if a heteroatom is present in the ring that the two carboxyl groups bind on carbon atoms in the ring.

Rd may be a phenyl group. The two carboxylic acid groups may occupy any position on the ring. For example, where R is a $C_6$ ring, the two carboxylic acid groups may be ortho, meta or para with respect to each other, preferably meta.

Examples of cyclic diesters include those of Formula B4 shown below:

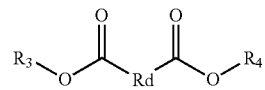

B4 wherein Rd is a saturated, unsaturated or aromatic $C_3$-$C_8$ ring, preferably a $C_5$-$C_6$ ring, optionally comprising one or more heteroatoms selected from the group consisting of N, O and S. It will be appreciated that if a heteroatom is present in the ring that the two ester groups bind on carbon atoms in the ring. The two ester groups may occupy any position on the ring. For example, where Rd is a $C_6$ ring, the two ester groups may be ortho, meta or para with respect to each other, preferably meta. $R_3$ and $R_4$ in Formula (III) are each independently a straight or branched chain $C_{1-20}$ alkyl group, preferably a $C_{1-10}$ alkyl group, more preferably $C_{1-6}$ alkyl group, more preferably a $C_{1-4}$ alkyl group; a straight or branched chain $C_{2-10}$ alkenyl group, preferably $C_{2-6}$ alkenyl group; a $C_{6-20}$ aryl group, a $C_{7-20}$ arylalkyl group, preferably $C_{7-12}$ arylalkyl group, preferably $C_{6-10}$ aryl group; and a $C_{3-20}$ cycloalkyl group, preferably $C_{4-15}$ cycloalkyl group, especially $C_{5-10}$ cycloalkyl group. $R_3$ and $R_4$ may be the same or different, preferably the same.

The above discussion assumes nucleophilic attack of the polysiloxane on the second monomer. If the siloxane is provided with a carboxyl end group then the second monomer could equally be a diol or triol.

Any HO-Q-OH diol could be used where Q is an aliphatic, cycloalkyl, cycloalkenyl, polyoxyalkylene or aromatic group having up to 20 carbon atoms such as an alkylene chain having up to 10 carbon atoms. The use of polyoxyalkyene such as:

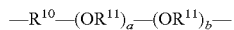

where $R^{10}$ and $R^{11}$ are each independently $C_{2-6}$ alkylene and a=0-50, b=0-50 and a+b=1-50 is preferred.

Thus preferred diols include
HO-Qz-OH where Qz is a polyoxyalkyene —$R^{10}$—$(OR^{11})_a$—$(OR^{11})_b$— or a $C_{1-10}$alkylene group;
where $R^{10}$ and $R^{11}$ are each independently $C_{2-6}$ alkylene and a=0-50, b=0-50 and a+b=1-50.

It is within the scope of the invention for more than one second monomer to be used in the preparation of the binder of the invention. Ideally, however, only one second monomer is used.

It is preferred if the second monomer is mixed in a roughly stoichiometric molar ratio with the polysiloxane or perhaps with a slight excess of one of the monomers, typically an excess of the nucleophile.

In a further embodiment, the second monomer might be a simple anhydride such as methyl anhydride. Anhydrides react with a carboxyl functionalised polysiloxane as shown in scheme 1.

Polyanhydride-Siloxane Copolymer

The anhydride linker tends to hydrolyse quickly generally giving rise to surface polishing films. Anhydrides of interest might be of formula

(B4)

where Rf is a C1-6 alkyl or two Rfs taken together form a ring, such as a $C_{1-6}$ alkyl ring.

As previously noted, the use of polyoxyalkylene side chains is a possibility, for example using a polysiloxane unit:

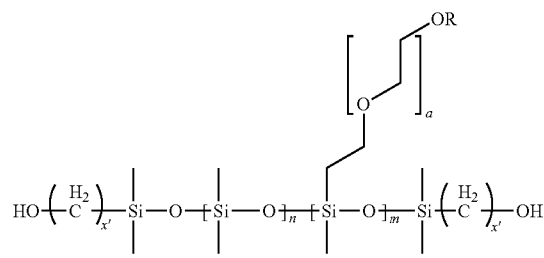

wherein m and n are independently 1 to 100, such as 1 to 50 and a is 1 to 10; R is $CH_3CO$—, $CH_3CH_2CO$—, HCO—, or $C_{1-6}$alkyl.

Scheme 1

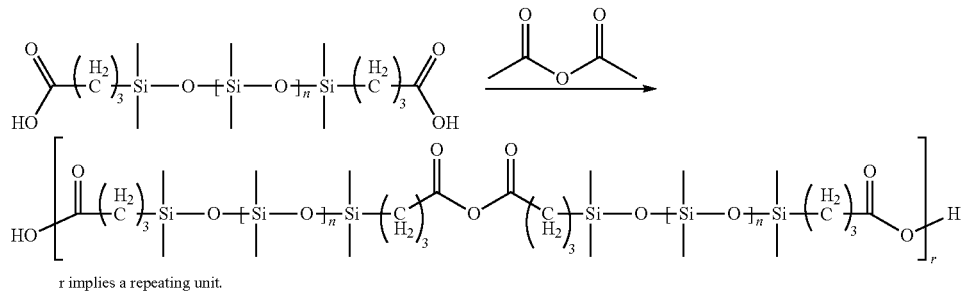

r implies a repeating unit.

In scheme 2, an acid chloride monomer B is employed:

Scheme 2

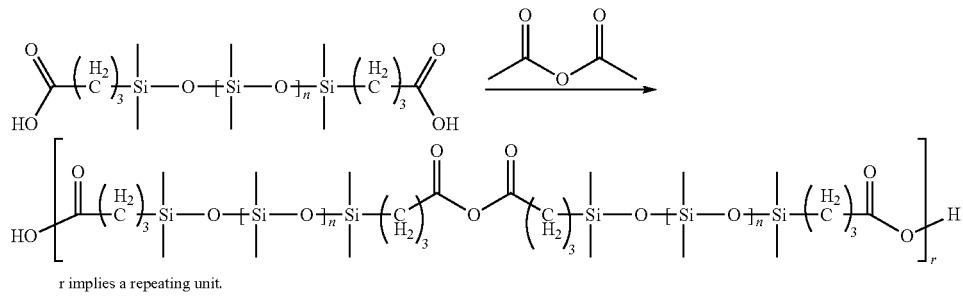

r implies a repeating unit.

Introduction of Polyether

In a preferred embodiment, the second monomer is designed so that it introduces a polyether group into the backbone of the molecule, e.g. a PEG or PPG group. The incorporated poly(oxyalkylene) such as PEG, PPG might have a Mn: 50-5000, such as 50-2000, more preferably less than 1000. Preferably PEG with 1-100, more preferably 1-50, especially 2-30 repeating units.

For example, incorporating PEG into a polyester-siloxane polymer backbone can be achieved via scheme 3

Scheme 3

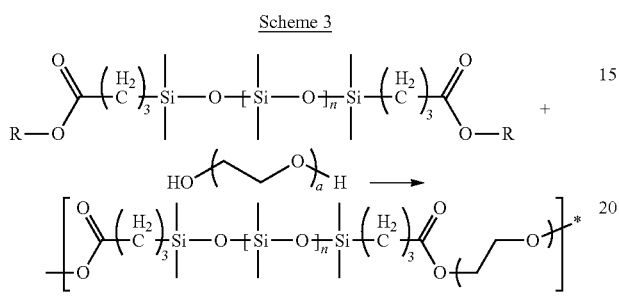

The presence of the polyether will help regulate the water-uptake of the polymer film formed using the binder and may add hydrogel-like properties with PEG giving inertness towards protein adsorption.

In a preferred option therefore, the monomer B' comprises an ethylene glycol or propylene glycol repeating unit.

Thus the monomer B' might comprise end groups W and Z (normally hydroxyls) linked by a linker comprising PEG or PPG.

The explanations above allow the person skilled in the art to design a variety of binders that meet the requirements of the functional definitions in the claims.

In one embodiment therefore, the invention relates to a hydrolysable binder comprising the reaction product of at least one polysiloxane of monomer A'

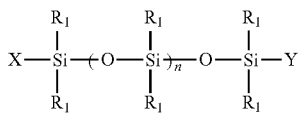

wherein each $R_1$ is methyl,
X and Y are the same and represent $(CH_2)_{x'}$—OH or —$(CH_2)_{x'}$—COOH or —$(CH_2)_{x'}$—COOR;
x' is 1 to 5, especially 2 to 5, such as 3 to 5;
R is $C_{1-6}$ alkyl; and
n is 10-300, especially 15-100.
and at least one second monomer B' of formula

RcOOC-Q-COORc (formula B")

or

Rc'O-Q-ORc' (formula B''')

where Q is an aliphatic, cycloalkyl, cycloalkenyl, polyoxyalkylene or aromatic group having up to 20 carbon atoms or a covalent bond or a linear polysiloxane and each Rc and Rc' are the same or different and represent H, $C_{1-20}$ alkyl, $C_{2-20}$ alkenyl, $C_{6-20}$ aryl, $C_{3-20}$ cycloalkyl group or $C_{7-20}$ arylalkyl group;

with the proviso that the Rc or Rc' groups in (formula B") or (formula B''') are selected to react with the X and Y groups in monomer A' to form a ester group.

Binder

It will be appreciated that devising a general formula to cover all possible options is difficult. In a preferred embodiment, the binder of use in the invention comprises units of formula (C)

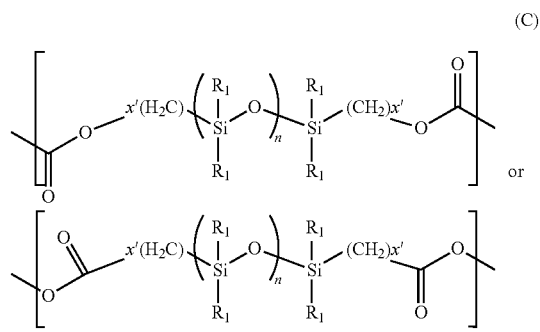

wherein each $R_1$ is the same or different and represents an unsubstituted or substituted $C_{1-20}$ alkyl, $C_{2-20}$ alkenyl, $C_{6-20}$ aryl, $C_{7-20}$ arylalkyl group or polyoxyalkylene group,
x' is as hereinbefore defined;
n is 1-500, more preferably 10-300 especially 15-100.

The binder of the invention preferably has a number average molecular weight Mn of 2,000 to 100,000 such as 5,000 to 80,000, especially 10,000 to 50,000.

The binder of the invention has a very low glass transition temperature, such as 0° C. or less, preferably −50° C. or less, especially −100° C. or less.

End Capping

The polymer may have end groups represented by F and G. Groups F and G are as defined above for X and Y (or W and Z) or groups F and G can be derived via a post polymerisation end capping or end modifying of the copolymer. By end capping/end modifying, we mean a post polymerisation functionalisation of the end groups that form naturally during the copolymerisation, e.g. to contain curable end groups or end groups that can react with a crosslinker. Crosslinking might also be encouraged through functionalisation of $R_1$ side groups.

F and G can be the same or different, typically the same as a slight excess of one of the monomers are used in the polymerisation. Preferably, F and G are alkoxy, hydroxyl group, or hydrolysable group(s) such as alkoxysilane or other functional groups such as amine or epoxy.

Ideally groups F and G are crosslinking groups, i.e. they are curable with or without the addition of a crosslinking agent. We discuss the option of end capping the polymer in detail below.

It will be appreciated also that the binder could involve different polysiloxane monomers and second and third monomers. The possibility of forming a terpolymer and so on is therefore within the scope of the invention.

Copolymer binders may be obtained by mixing all starting materials before polymerisation or by dosing one of the monomers during the reaction. It will be appreciated that the skilled person will know how to carry out polymerisations depending on the monomers employed. The binder which forms is typically an alternating ABABAB polymer of the units used, since units A and B are only able to react with each other and not themselves. If there is more than one of either type of unit then the pattern can change but it will be appreciated that a polysiloxane unit should not polymerise with itself and the second monomer should not polymerise with itself. It requires the presence of a second monomer to cause a polymerisation. The polymer is preferably not a block copolymer. If there are two second monomers B and C then the pattern is AXAXAX where X is randomly selected from B or C. The amounts of B and C present would depend in the stoichiometry of the polymerisation.

The polymerisation conditions can be widely varied although typically temperatures of 20 to 250° C. are employed, e.g. 40 to 220° C. In the case that the polymerisation in question is a condensation polymerisation a condensate (normally water or an alcohol) is formed. This is preferably removed by distillation as the polymerisation continues. This can be achieved under reduced pressure. The polymerisation is preferable carried out in an inert atmosphere, e.g. nitrogen. In the case the polymerisation in question is an addition polymerisation, feeding of one of the monomers is preferred due to control of exothermic reaction.

The binder of the present invention have a number average molecular weight (Mn) of at least 5000 g/mol, preferably at least 10000 g/mol, more preferably at least 15000 g/mol, especially greater than 20000 g/mol. In an especially preferred embodiment, values of more than 10,000 g/mol are preferred. The number average molecular weight is preferably up to 100,000 g/mol, such as up to 80,000 g/mol.

There is however, a trade off here as increasing the Mn too far increases viscosity and means that more solvent is required to ensure that the coating composition can be applied. More solvent increases volatile organic content which is not desired. It will be appreciated of course, that the binder as a whole can be made from a mixture of two or more binders with different Mn and/or different hydrolysing properties/rates, i.e. different hydrolysing groups and (content of hydrolysing groups). By varying the nature of the binder components, we can vary the speed of hydrolysis.

It is preferred if the binder forms at least 30 wt %, e.g. at least 40 wt %, such as at least 50 wt %, of the coating composition. The binder may form up to 70 wt % or less, such as 60% or less of the coating composition.

Crosslinking and Curing Agent

In some embodiments on the invention, it is preferred to crosslink the binder polymer in use. The binder polymer of the invention may possess a curable end group due to the nature of the groups used to form the binder polymer or due to endcapping. Such groups include silanol, carbinol, carboxyl, ester, hydride, alkenyl, vinyl ether, allyl ether, alkoxysilane and alkoxy groups. Alternatively, the end group of the polymer can be end capped with a reactive group to allow a crosslinking reaction to occur.

The binder of the invention can be crosslinked in the absence or in the presence of a curing agent.

Examples of curing agents well known in the art include, for example, monomeric isocyanates, polymeric isocyanates and isocyanate prepolymers. Polyisocyanates are preferred over monomeric isocyanates because of lower toxicity. Polyisocyanates can for example be based on diphenylmethane diisocyanate (MDI), toluene diisocyanate (TDI), hexamethylene diisocyanate (HDI) and isophorone diisocyanate (IPDI) chemistry. These are for example supplied under the tradename Desmodur by Bayer Material Science and Tolonate by Vencorex. Examples of polyisocyanates are Desmodur N3400, Desmodur N3300, Desmodur N3600 Desmodur N75, Desmodur XP2580, Desmodur Z4470, Desmodur XP2565 and Desmodur VL, supplied by Bayer Material Science.

Polyisocyanates can be made with different NCO-functionality. The NCO-functionality is the amount of NCO-groups per polyisocyante molecule or isocyanate prepolymer molecule. Polyisocyanates curing agents with different NCO-functionality can be used.

The curing agent is preferably present in an amount of 0.8-1.5 equivalents (equiv) NCO groups relative the amount of hydroxyl groups, preferably 0.9-1.4 equiv, more preferably 0.95-1.3 equiv, even more preferably 1-1.2 equiv.

The functionality of the end-groups of the binder will depend on the starting monomers. The end groups can easily be modified to other functional groups suitable for a wide range of curing reactions. Examples of other curable end groups include epoxy groups.

Ethylenically unsaturated groups such as (meth)acrylate groups may be introduced, for example, by reacting the hydroxyl groups in the binder with ethylenically unsaturated carboxylic acids, such as acrylic acid or methacrylic acid.

It is preferred therefore if the binder inherently contains curable end groups or are modified to contain curable end groups. Compounds which have been modified to contain curable end groups may be referred to specifically as end group modified binders (or end capped modified binders).

An alternative end group modifying agent is one comprising an alkoxysilane such as monoalkoxysilane, dialkoxysilane or trialkoxysilane. Current commercial fouling release coatings are commonly cured by a condensation curing mechanism involving hydrolysis of (m)ethoxy-silane compounds. This has advantages compared to e.g. isocyanate-based crosslinking as it minimizes the amount of polar entities introduced (which may cause increased polar interactions with fouling species). In order to facilitate a similar condensation curing mechanism for the binders of the invention, an end-capping reaction of the terminal functional groups may be performed.

For example, an alkoxysilane such as 3-isocyanatopropenyltrimethoxysilane can be employed to alter a terminal hydroxyl group.

In a further embodiment therefore, the binder is end capped with a compound comprising the group $-SiR''_d(OR^{11})_{3-d}$ where d=0-2, R'' and R' independently selected from $C_{1-6}$ alkyl. Examples are trimethoxysilyl, triethoxysilyl, methyldiethoxysilyl, methyldimethoxysilyl, dimethylmethoxysilyl and dimethylethoxysilyl. The compound as a whole comprises this siloxy group and a further functional group capable of reacting with the end group on the formed copolymer binder. The end capping unit is ideally a low molecular weight compound having a Mn of up to 400.

Examples of compounds used include 3-isocyanatopropyltrimethoxysilane, 3-isocyanatopropyltriethoxysilane, 3-aminopropyltrimethoxysilane, 3-aminopropyltriethoxysilane, (3-glycidoxypropyl)trimethoxysilane, 3-chloropropyltrimethoxysilane, 3-mercaptopropyltrimethoxysilane, allyltrimethoxysilane and vinyltrimethoxysilane. In the presence of moisture, the siloxy end groups present at the end of the binder will then begin to crosslink. In some instances the end groups may be mono(m)ethoxysilane in which case a separate crosslinking agent may be used to cure the coating (e.g. alkoxysilane such as methyl trimethoxysilane or condensation products thereof (e.g. WACKER® TES 40 WN)).

The cross-linking agent preferably constitutes 0-10% by dry weight of the coating composition and is, e.g. an organosilicon compound represented by the general formula (2) shown below, a partial hydrolysis-condensation product thereof, or a mixture of the two:

$$R_a-Si-X_{4-d} \qquad (2)$$

wherein, each R represents, independently, an unsubstituted or substituted monovalent hydrocarbon group of 1 to 6 carbon atoms, each X represents, independently, a hydrolysable group, and d represents an integer from 0 to 2, such as from 0 to 1.

The mixing of the binder polymer and the curing agent can be carried out shortly before application of the coating to an object, e.g. an hour or less before coating or the binder can be supplied in curable form but kept dry in order to prevent premature curing. In some embodiments the curing agent/end capping agent is supplied separately to the rest of the coating composition to prevent curing before the coating has been applied to the object. In case the ends are mono (m)ethoxysilane a (m)etoxy silane crosslinker, e.g. TES 40 WN, may be used in combination with the binder. Hence the coating composition of the invention can be supplied as a multipack (preferably two pack) formulation.

Viewed from another aspect therefore the invention provides a kit comprising (I) a binder polymer as described herein and (II) a curing or end capping agent. It would preferably be supplied with instructions on mixing the components shortly before application. One or other component may also be supplied with a catalyst to encourage the crosslinking process.

Coating Composition

The coating composition of the invention contains the binder or a mixture of binders. The composition may also contain other conventional components of a fouling release composition.

The polysiloxane-based binder system typically constitutes 20-90% by dry weight, at least 40% by dry weight, in particular 50-90% by dry weight, of the coating composition.

The binder of the present invention will degrade in sea water. It will be understood that the degradation reactions which the binder undergoes is a hydrolysis reaction which occurs in the polymer backbone, i.e. the hydrolysable bonds are present in the polymer backbone.

In addition to the binder, the coating composition of the invention may include other components such as additive oils, catalysts, biocides, enzymes and cobinders. Other conventional components include solvents, additives, pigments and fillers.

Additive Oils

The coating composition might contain well known hydrophilic-modified additive oils e.g. as described in WO2011/076856. The composition may further include hydrophilic-modified polysiloxane oils, i.e. constituents which do not form covalent bonds to the polysiloxane-based binder matrix. Hydrophilic-modified polysiloxane oils are widely used as surfactants and emulsifiers due to the content of both hydrophilic and lipophilic groups in the same molecule. In contrast to the polysiloxane components discussed above, the hydrophilic-modified polysiloxane oils are selected so that they do not contain groups that can react with the binder (or binder components) or the cross-linker (if present), hence the hydrophilic-modified polysiloxane oils are intended to be non-reactive, in particular with respect to the binder components. In particular, the hydrophilic-modified polysiloxane oils are devoid of any silicon-reactive groups such as Si—OH groups, hydrolysable groups such as Si—OR (such as alkoxy, oxime, acetoxy etc.) groups, so as to avoid reaction with constituents of the polysiloxane-based binder system.

The non-reactive hydrophilic-modified polysiloxane oils are typically modified by the addition of non-ionic oligomeric or polymeric groups which can be polar and/or capable of hydrogen bonding, enhancing their interaction with polar solvents, in particular with water, or with other polar oligomeric or polymeric groups. Examples of these groups include, amides (e.g. poly(vinyl pyrrolidone), poly [N-(2-hydroxypropyl)methacrylamide]), poly(N,N-dimethacrylamide), acids (e.g. poly(acrylic acid)), alcohols (e.g. poly(glycerol), polyHEMA, polysaccharides, poly(vinyl alcohol)), ketones (polyketones), aldehydes (e.g. poly(aldehyde guluronate), amines (e.g. polyvinylamine), esters (e.g. polycaprolactones, poly(vinyl acetate)), ethers (e.g. polyoxyalkylenes like poly(ethylene glycol), poly(propylene glycol)), imides (e.g. poly(2-methyl-2-oxazoline)), etc., including copolymers of the foregoing.

Preferably the hydrophilicity is obtained by modification with polyoxyalkylene groups. In a preferred embodiment, the hydrophilic-modified polysiloxane oil (if present) has a number average molecular weight (Mn) in the range of 100-100,000 g/mol, such as in the range of 250-75,000 g/mol, in particular in the range of 500-50,000 g/mol.

The one or more hydrophilic-modified polysiloxane oils are included in the coating composition in an amount of 0.01-30%, e.g. 0.05-10%, by dry weight. In certain embodiments, the one or more hydrophilic-modified polysiloxane oils constitutes 0.05-7% by dry weight, e.g. 0.1-5% by dry weight, in particular 0.5-3% by dry weight, of the coating composition.

Other additive oils of interest are described in WO2008132196. Suitable unreactive fluids are silicone oils such as methylphenyl silicone oil, polydimethylsiloxane, carboxyl-functional organisiloxanes as disclosed in WO 2008/132195; petroleum oils, polyolefin oils, polyaromatic oils, fluoro resins such as polytetra-fluoroethylene or fluid fluorinated alkyl- or alkoxy-containing polymers, or lanolin and lanolin derivatives and other sterol(s) and/or sterol derivative(s) as disclosed in PCT Application No PCT/EP2012/065920 or combinations thereof. A preferred unreactive fluid is methylphenyl silicone oil. Also of interest are fluorinated amphiphilic polymers/oligomers described in WO2014131695. The proportion of unreacted fluid is preferably 5-25 wt %, more preferably 5-10 wt %, based on the solids content of the coating composition.

Biocides/Anti-Fouling Agent

In one embodiment, a biocide can be used in the binder of the invention. Suitable biocides are well known and can be found in WO2013/000479.

In the present context, the term "biocide" is intended to mean an active substance intended to destroy, deter, render harmless, prevent the action of, or otherwise exert a controlling effect on any harmful organism by chemical or biological means. Illustrative examples of biocides are those selected from metallo-dithiocarbamates such as bis(dimethyldithiocarbamato)zinc, ethylene-bis(dithiocarbamato)zinc, ethylene-bis(dithio-carbamato)manganese, and complexes between these; bis(1-hydroxy-2(1H)-pyridine-thionato-0, S)-copper; copper acrylate; bis(1-hydroxy-2(1H)-pyridinethionato-0,S)-zinc; phenyl(bispyridyl)-bismuth dichloride; metal biocides such as copper(I)oxide, cuprous oxide, metallic copper, copper metal alloys such as copper-nickel alloys; metal salts such as cuprous thiocyanate, basic copper carbonate, copper hydroxide, barium metaborate, and copper sulphide; heterocyclic nitrogen compounds such as 3a,4,7,7a-tetrahydro-2-((trichloro-methyl)-thio)-1H-isoindole-1,3(2H)-dione, pyridine-triphenylborane, 1-(2,4,6-trichloro-phenyl)-1H-pyrrole-2,5-dione, 2,3,5,6-tetrachloro-4-(methylsulfonyl)-pyridine, 2-methylthio-4-tert-butylamino-6-cyclopropylamine-s-triazin, and quinoline derivatives; heterocyclic sulfur compounds such as 2-(4-thiazolyl)benzimidazole, 4,5-dichloro-2-n-octyl-4-isothiazolin-3-one, 4,5-dichloro-2-octyl-3 (2H)-isothiazo line (Sea-Nine<®>-211N), 1,2-benzisothiazolin-3-one, and 2-(thiocyanatomethylthio)-benzothiazole; urea derivatives such as N-(1,3-bis(hydroxymethyl)-2,5-dioxo-4-imidazolidinyl)-N,N'-bis(hydroxymethyl)urea, and N-(3,4-dichlorophenyl)-N,N-dimethylurea, N,N-dimethylchlorophenylurea; amides or imides of carboxylic acids; sulfonic acids and of sulfenic acids such as 2,4,6-trichlorophenyl maleimide, 1,1-dichloro-N-((dimethylamino)sulfonyl)-1-fluoro-N-(4-methylphenyl)-methanesulfenamide, 2,2-dibromo-3-nitrilo-propionamide, N-(fluorodichloromethylthio)-phthalimide, N,N-dimethyl-N'-phenyl-N'-(fluorodichloromethylthio)-sulfamide, and N-methylol formamide; salts or esters of carboxylic acids such as 2-((3-iodo-2-propynyl)oxy)-ethanol phenylcarbamate and N,N-didecyl-N-methyl-poly(oxyethyl)ammonium propionate; amines such as dehydroabiethyl-amines and cocodimethylamine; substituted methane such as di(2-hydroxy-ethoxy)methane, 5,5'-dichloro-2,2'-dihydroxydiphenylmethane, and methylene-bisthiocyanate; substituted benzene such as 2,4,5,6-tetrachloro-1,3-benzenedicarbonitrile, 1,1-dichloro-N-((dimethyl-amino)-sulfonyl)-1-fluoro-N-phenylmethanesulfenamide, and 1-((diiodomethyl)sulfonyl)-4-methyl-benzene; tetraalkyl phosphonium halogenides such as tri-n-butyltetradecyl phosphonium chloride; guanidine derivatives such as n-dodecylguanidine hydrochloride; disulfides such as bis-(dimethylthiocarbamoyl)-disulfide, tetramethylthiuram disulfide; phenylcapsaicin;

imidazole containing compound, such as medetomidine; 2-(p-chlorophenyl)-3-cyano-4-bromo-5-trifluoromethyl pyrrole and mixtures thereof. Presently, it is preferred that the biocide does not comprise tin.

Currently preferred biocides are those selected from the group consisting of 2,4,5,6-tetra-chloroisophtalonitrile (Chlorothalonil), copper thiocyanate (cuprous sulfocyanate), N-dichloro-fluoromethylthio-N',N'-dimethyl-N-phenylsulfamide (Dichlofluanid), 3-(3,4-dichlorophenyl)-1,1-dimethylurea (Diuron), N2-tert-butyl-N4-cyclopropyl-6-methylthio-1,3,5-triazine-2,4-diamine (Cybutryne), 4-bromo-2-(4-chlorophenyl)-5-(trifluoromethyl)-1H-pyrrole-3-carbonitrile, (2-(p-chlorophenyl)-3-cyano-4-bromo-5-trifluoromethyl pyrrole; Tralopyril), Cybutryne, (RS)-4-[1-(2,3-dimethylphenyl)ethyl]-3H-imidazole (Medetomidine), 4,5-dichloro-2-n-octyl-4-isothiazolin-3-one (DCOIT, Sea-Nine® 211N), dichlor-N-((dimethyl-amino)sulfonyl)fluor-N-(p-tolyl)methansulfenamid (Tolylfluanid), 2-(thiocyanomethylthio)-1,3-benzothiazole ((2-benzothiazolylthio)methyl thiocyanate; TCMTB), triphenylborane pyridine (TPBP); bis(1-hydroxy-2(1H)-pyridinethionato-0,S)-(T-4) zinc (zinc pyridinethione; zinc pyrithione), bis(1-hydroxy-2(1H)-pyridinethionato-0,S)-T-4) copper (copper pyridinethione; copper pyrithione; Copper Omadine), zinc ethylene-1,2-bis-dithiocarbamate (zinc-ethylene-N—N'-dithiocarbamate; Zineb), copper(i) oxide, metallic copper, 3-(3,4-dichlorophenyl)-1,1-dimethylurea (Diuron) and diiodomethyl-p-tolylsulfone; Amical 48, phenylcapsaicin. Preferably at least one biocide is selected from the above list.

In a particularly preferred embodiment, the biocides are preferably selected among biocides which are effective against soft fouling such as slime and algae. Examples of such biocides are N2-tert-butyl-N4-cyclopropyl-6-methylthio-1,3,5-triazine-2,4-diamine (Cybutryne), 4,5-dichloro-2-n-octyl-4-isothiazolin-3-one (DCOIT, Sea-Nine® 211N), bis(1-hydroxy-2(1H)-pyridinethionato-0,S)-(T-4) zinc (zinc pyridinethione; zinc pyrithione), bis(1-hydroxy-2(1H)-pyridinethionato-0,S)-T-4) copper (copper pyridinethione; copper pyrithione) and zinc ethylene-1,2-bis-dithiocarbamate (zinc-ethylene-N—N'-dithiocarbamate; Zineb), copper(I) oxide, metallic copper, copper thiocyanate, (cuprous sulfocyanate), bis(1-hydroxy-2(1H)-pyridinethionato-O,S)-T-4) copper (copper pyridinethione; copper pyrithione; Copper Omadine).

In a further particularly preferred embodiment, the biocide is an organic biocide, such as a pyrithione complex, such as zinc pyrithione, or such as copper pyrithione. Organic biocides are those either fully or in part being of organic origin. Optionally the marine anti-fouling agents may be encapsulated or adsorbed on an inert carrier or bonded to other materials for controlled release.

The total amount of organic biocide in the antifouling compositions of the invention may be in the range 0.1 to 40 wt %, such as 0.1 to 20 wt %, such as 0.5 to 10 wt % (dry weight of the coating composition), e.g. 1-8 wt %. The total amount of inorganic biocides such as cuprous oxide, copper (I) oxide, metallic copper etc. in the antifouling composition of the invention may be in the range of 0.5-80% by dry weight, such as 1-70. It will be appreciated that the amount of this component will vary depending on the end use and the marine anti-fouling agent used.

Catalyst

In order to assist the curing process, the coating composition of the invention might contain a catalyst. WO2014/131695 gives an extensive list of possible catalysts. Examples of catalysts that can be used include transition metal compounds, metal salts and organometallic complexes of various metals, such as tin, iron, lead, barium, cobalt, zinc, antimony, cadmium, manganese, chromium, nickel, aluminium, gallium, germanium and zirconium. The salts preferably are salts of long-chain carboxylic acids and/or chelates or organometal salts. Examples of suitable catalysts include for example, dibutyltin dilaurate, dibutyltin dioctoate, dibutyl tin diacetate, dibutyl tin 2-ethylhexanoate, dibutyltin di neodecanoate, dibutyl tin dimethoxide, dibutyltin dibenzoate, dibutyltin acetoacetonate, dibutyltin acetylacetonate, dibutyltin alkylacetoacetonate, dioctyltin dilaurate, dioctyltin dioctoate, dioctyl tin diacetate, dioctyl tin 2-ethylhexanoate, dioctyltin di neodecanoate, dioctyl tin dimethoxide, dioctyltin dibenzoate, dioctyltin acetoacetonate, dioctyltin acetylacetonate, dioctyltin alkylacetoacetonate, dimethyltin dibutyrate, dimethyltin bisneodecanoate, dimethyltin dineodecanoate, tin naphthenate, tin butyrate, tin oleate, tin caprylate, tin octanoate, tin strearate, tin octoate, iron stearate, iron 2-ethylhexanoate, lead octoate, lead 2-ethyloctoate, cobalt-2-ethylhexanoate, cobalt naphthenate, manganese 2-ethylhexanoate, zinc 2-ethylhexanoate, zinc naphthenate, zinc stearate, metal triflates, triethyl tin tartrate, stannous octoate, carbomethoxyphenyl tin trisuberate, isobutyl tin triceroate.

Further examples of suitable catalysts include organobismuth compounds, such as bismuth 2-ethylhexanoate, bismuth octanoate and bismuth neodecanoate. Further examples of suitable catalysts include organotitanium, organzirconium and organohafnium compounds and titanates and zirconate esters such as, titanium naphthenate, zirconium naphthenate, tetrabutyl titanate, tetrakis(2-ethylhexyl)titanate, triethanolamine titanate, tetra(isopropenyloxy)-titanate, titanium tetrabutanolate, titanium tetrapropanolate, titanium tetraisopropanolate, tetrabutyl zirconate, tetrakis(2-ethylhexyl) zirconate, triethanolamine zirconate, tetra(isopropenyloxy)-zirconate, zirconium tetrabutanolate, zirconium tetrapropanolate, zirconium tetraisopropanolate and chelated titanates such as diisopropyl bis(acetylacetonyl)titanate, diisopropyl bis(ethylacetoacetonyl)titanate and diisopropoxytitanium bis(ethylacetoacetate), and the like.

Preferably the catalyst is present in an amount of 0.01 to 5 wt % based on the total weight of the coating composition, especially 0.05 to 4 wt %.

Solvent, Pigments, Fillers and Additives

The coating may contain solvents. Suitable solvents include aliphatic, cycloaliphatic and aromatic hydrocarbons, alcohols, ketones, esters, and mixtures of the above. Examples of suitable solvents are white spirit, cyclohexane, toluene, xylene and naphtha solvent, esters such as methoxypropylacetate, n-butyl acetate and 2-ethoxyethylacetate; octamethyltrisiloxane, and mixtures thereof. The solvents, if any, typically constitute 5 to 50 wt % based on the total weight of the coating composition. The solid content may be determined in accordance with ASTM method D2697.

The coating composition of the invention may also comprise pigments. Examples of pigments include black iron oxide, red iron oxide, yellow, iron oxide, titanium dioxide, zinc oxide, carbon black, graphite, red molybdate, yellow molybdate, zinc sulfide, antimony oxide, sodium aluminium sulfosil icates, quinacridones, phthalocyanine blue, phthalocyanine green, indanthrone blue, cobalt aluminium oxide, carbazoledioxazine, chromium oxide, isoindoline orange, bis-acetoaceto-tolidiole, benzimidazolone, quinaphthalone yellow, isoindoline yellow, tetrachloroisoindolinone, and quinophthalone yellow, metallic flake materials (e.g. aluminium flakes) or other so-called barrier pigments or anti-corrosive pigments such as zinc dust or zinc alloys or other so-call lubricant pigments such as graphite, molybdenum disulfide, tungsten disulphide or boron nitride. Preferred pigments are black iron oxide, red iron oxide, yellow iron oxide, sodium aluminium sulfosilicate and titanium dioxide.

The proportion of pigment may be in the range of from 0 to 25 wt % by weight, based on the total weight of the coating composition, preferably in the range 0 to 15 wt %.

The coating composition of the invention may also comprise fillers. Examples of fillers that can be used in the coating composition according to the present invention are zinc oxide, barium sulphate, calcium sulphate, calcium carbonate, silicas or silicates (such as talc, feldspar, and china clay) including pyrogenic silica, bentonite and other clays, and solid silicone resins, which are generally condensed branched polysiloxanes. Some fillers such as fumed silica may have a thixotropic effect on the coating composition. The proportion of fillers may be in the range of from 0 to 25 wt % by weight, based on the total weight of the coating composition, preferably in the range 0 to 10 wt % and more preferably in the range 0 to 5 wt %.

The coating composition according to the present invention optionally comprises one or more components selected among other surfactants, wetting agents, thickeners, antisettling agents, and dyes.

An additional binder can be used to adjust the self-polishing properties and the mechanical properties of the coating film. Examples of binders that can be used in addition to the binder of the invention in the coating composition according to the present invention include other polysiloxanes.

Application of the Coating Composition

The coating composition of the invention can be applied to a whole or part of any object surface which is subject to fouling. The surface may be permanently or intermittently underwater (e.g. through tide movement, different cargo loading or swell). The object surface will typically be the hull of a vessel or surface of a fixed marine object such as an oil platform or buoy. Application of the coating composition can be accomplished by any convenient means, e.g. via painting (e.g. with brush or roller) or spraying the coating onto the object. Typically the surface will need to be separated from the seawater to allow coating. The application of the coating can be achieved as conventionally known in the art.

The coating composition can be applied by normal techniques, such as brushing, roller coating, or spraying (airless and air-assisted). To achieve proper adhesion to the substrate it is preferred to apply the coating composition to a primed substrate. The primer can be any conventional primer/sealer coating system suitable for PDMS coating. It is also possible to apply the coating composition according to the present invention on a substrate containing an aged anti-fouling coating layer or fouling release layer. Before the coating composition according to the present invention is applied to such an aged layer, this old layer is cleaned by high-pressure water washing to remove any fouling. The primer disclosed in WO 99/33927 can be used as a tie coat between the aged coating layer and the coating composition according to the present invention. Optionally the primer may comprise adhesion promoters as disclosed in WO 2010/018164.

Optionally the primer may comprise a biocide. After the coating has been cured it can be immersed immediately and gives immediate anti-fouling or fouling-release protection. As indicated above, the coating composition according to the present invention has very good anti-fouling and fouling-release properties. This makes these coating compositions very suitable for use as anti-fouling or fouling release coatings for marine applications. The coating can be used for both dynamic and static structures, such as boat hulls, buoys, drilling platforms, dry dock equipment, oil and/or gas production rigs, floating oil and gas processing, storage and offloading vessels, aqua culture equipment, netting and cages, energy generation devices such as offshore wind turbines and tidal and wave energy devices, cooling water intakes for power plants and power stations and pipes which are immersed in water and tanks, pipes and conduits used to store and transport water. The coating can be applied on any substrate that is used for these structures, such as metal, concrete, wood, plastic or fibre-reinforced plastic.

The invention will now be defined with reference to the following non limiting examples.

Determination of the SiH Content

The determinations of the SiH values of the hydrogen siloxanes used but also that of the reaction matrices are carried out in each case gas-volumetrically by means of the sodium butylate-induced decomposition of aliquot weighed-in sample amounts in a gas burette. Used in the general gas equation, the measured hydrogen volumes permit the determination of the content of active SiH functions in the starting materials but also in the reaction mixtures and thus permit conversion control.

Determination of Polymer Molar Mass Distribution

The polymers are characterised by Gel Permeation Chromatography (GPC) measurement. The molecular weight distribution (MWD) was determined using a Polymer Laboratories PL-GPC 50 instrument with two PLgel 5 μm Mixed-D columns (300×7.5 mm) from Polymer Laboratories in series, Tetrahydrofuran as eluent at ambient temperature and at a constant flow rate of 1 mL/min and with a refractive index (RI) detector. The columns were calibrated using polystyrene standards Easivials PS-M from Polymer Laboratories. The data were processed using Cirrus software from Polymer Labs.

Samples were prepared by dissolving an amount of polymer solution corresponding to 5 mg dry polymer in 5 mL Tetrahydrofuran. The samples were kept for minimum 4 hours at room temperature prior to sampling for the GPC measurements.

The weight-average molecular weight (Mw), the number-average molecular weight (Mn) and the dispersity ($Đ_M$), equivalent to Mw/Mn, are reported in the tables.

Infrared Spectroscopy (IR)

IR spectra were recorded on a Perkin-Elmer Spectrum 100 FTIR equipped with a single reflection attenuated total reflection (ATR) accessory from Specac Ltd.

Water Uptake and Film Loss

The water uptake was determined by gravimetric method. The coatings were applied on pre-weighed and numbered glass panels using film applicator with 300 μm gap size. The films were dried under ambient conditions for at least 1 day, at 50° C. overnight and then in desiccator under vacuum for 24 h. After drying the coated glass panels were weighed and placed in containers filled with artificial seawater. The artificial seawater was prepared by dissolving NaCl in deionized water (33.3 g/L) and, if necessary, adjusting the pH to 8.1-8.4 using 2M HCl(aq) or NaOH (aq) solutions.

At the reading, the panels and coating surfaces were quickly dried using compressed air. The panels were weighed and thereafter dried at 50° C. for 2 days and then placed in a desiccator under vacuum for 24 hours before they were weighted again. The difference in weight before and after drying relative to the dry weight of the coating film after exposure is expressed as the water uptake in percentage. The difference in weight of the dried films at a reading relative to the initial dry film weight before exposure is expressed as the film loss in percentage. The results are presented as an average of three parallels.

Differential Scanning Calorimetry (DSC)

Measurements were carried out using a Mettler Toledo DCS 1 instrument. 10 mg of sample was loaded in a closed aluminium crucible scanning a temperature range of -150° C. to 50° C. and using a heating rate of 10° C./min.

Chemicals:

Alpha, omega-carbinol siloxane, e.g. Tegomer H—Si 2115 (n=10) or Tegomer H—Si 2315 (n=30), Evonik.

alpha,omega-hydrogen Siloxan (a,w–n=30), SiH=0.9 mol H/kg alpha,omega-hydrogen Siloxan (a,w–n=10), SiH=3.24 mol H/kg Methyl 5-Hexenoate, available from TCI Europe GmbH)

Diethyl-ester monomers (diethyl oxalate, diethyl succinate, diethyl adipate), available from Sigma-Aldrich.

3-isocyanatpropyl trimethoxysilane, available from Wacker

Ti(IV) Butoxide, Dibutyltin dilaurate, available from Sigma-Aldrich.

The Karstedt-Catalyst solution used are platinum(0)-divinyltetramethyldisiloxane complexes in the concentration of 0.1% by weight platinum (available from Gelest/ABCR AB153234, CAS 68478-92-2, 2.1-2.4% by weight of platinum, which is adjusted to 0.1% by weight of Pt by dilution with decamethylcyclopentasiloxane). The dosages of the catalyst given in the example below refer to the mass total of the initial weights of the reaction components of the hydrosilylation, added solvents are not taken into consideration in this calculation.

EXAMPLES

Example 1-3: Ester-Siloxane Binders by Transesterification of Carbinol Terminated Polydimethylsiloxane and Diethyl-Ester Monomers

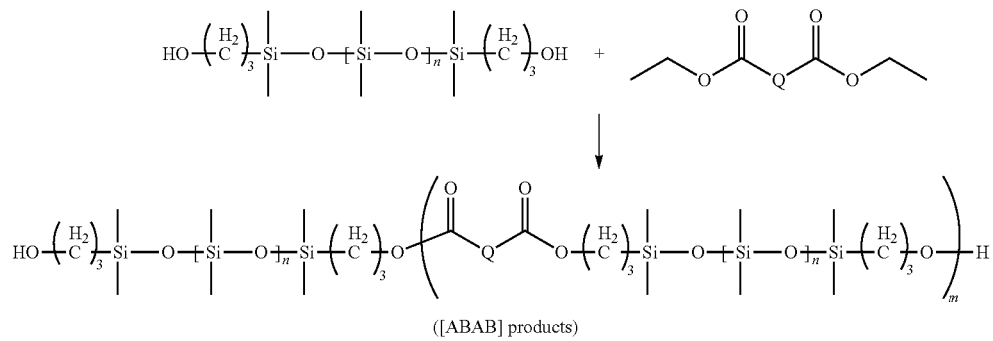

([ABAB] products)

Determination of Polishing Rates of Coating Films in Seawater

The polishing rate was determined by measuring the reduction in film thickness of a coating film over time. For this test PVC discs were used. The PVC discs were pre-coated with suitable primer/tie-coat for the coating compositions. The coating compositions were applied as radial stripes on the disc using a film applicator. The thickness of the dry coating films were measured by means of a laser surface profiler. The PVC discs were mounted on a shaft and rotated in a container in which seawater is flowing through. Natural seawater which has been filtered and temperature-adjusted to 25° C.±2° C. was used. The PVC discs were taken out at regular intervals for measuring the film thickness. The discs were rinsed and allowed to dry overnight at room temperature before measuring the film thickness.

TABLE 1

|  | Example 1 | Example 2 | Example 3 |
|---|---|---|---|
| Polydimethylsiloxane, carbinol terminated [g] (n = 30) | 100.0 | 100.0 | 100.0 |
| Diethyl Oxalate, DEO (Q = $C_0$) [g] | 6.3 | — | — |
| Diethyl Succinate, DES (Q = $C_2H_4$) [g] | — | 6.9 | — |
| Diethyl Adipate, DEA (Q = $C_4H_8$) [g] | — | — | 7.4 |
| Titanium (IV) butoxide [mg] | 53 | 53 | 54 |
| Mn (GPC), [g/mol] | 10660 | 14080 | 14840 |
| Mw (GPC), [g/mol] | 17980 | 38560 | 30890 |
| $Đ_M$ (GPC) | 1.69 | 2.74 | 2.08 |

Polymerization Procedure:

Carbinol-terminated PDMS (n=30) and diethyl-ester monomers (DEO, DES, DEA) were polymerized at a stoichiometric ratio of 1.1:1 with 0.05% (w/w) of Titanium (IV) butoxide catalyst. A typical condensation reaction setup was used. The two reactants and catalyst were stirred at room temperature for 10 minutes after which the temperature was gradually increased to 200° C. making sure that the refluxing temperature did not exceed 78.4° C. When no more formation of liquid condensate was observed vacuum was applied gradually to 10 mbar. The poly-condensation reaction was allowed to continue at 10 mbar for 5-6 h after which it was terminated by releasing the vacuum and the reaction mixture was allowed to cool to room temperature.

GPC analysis of the starting carbinol-terminated PDMS (n=30) showed a Mn of 2300 g/mol and Mw of 3330 g/mol. The significantly higher molecular weights obtained for Example 1-3 (GPC: Mn/Mw, Table 1) indicate that polymerization was successful for all three binders. Example 1 (polymerization with DEO) resulted in a binder with DEO terminal groups, in spite of the stoichiometric excess of PDMS-carbinol monomer. This is due to the changed reactivity of the second ethyl-ester of DEO once the first ethyl ester has reacted with the PDMS-carbinol. The presence of DEO terminal groups was confirmed with FT-IR by the lack of characteristic alcohol stretch at around 3200-3550 cm$^{-1}$ and the presence of two distinct ester-stretches around 1735-1750 cm$^{-1}$ for the resulting binder (Example 1). The example 1 binder also failed to undergo further crosslinking reaction with isocyanate cross-linker (Desmodur® N3600, Bayer). In Example 2 and 3, where the ethyl-ester groups of DES and DEA are separated by $C_2/C_4$-alkyl link, respectively, the reactivity of the ethyl-ester groups do not experience the same change of reactivity. Example 2 and 3 polymerizations thus resulted in carbinol-terminated binders due to the slight excess of PDMS-carbinol monomer. This was confirmed by presence of the characteristic alcohol stretch around 3200-3550 cm$^{-1}$, a single ester-stretch around 1735-1750 (FT-IR) and the ability of the binders to crosslink with isocyanate cross-linker (Desmodur® N3600, Bayer).

Example 4: Ester-Siloxane Binders by Transesterification of Carbinol Terminated Polydimethylsiloxane and Methyl Ester Terminated Polydimethylsiloxane Preparing methyl ester terminated siloxane (PrecursorSiloxane-1) Hydrosilylation of a alpha,omega-SiH Siloxane (n=10) with Methyl 5-Hexenoate forming a alpha,omega-methylesterfunctional Siloxane (PrecursorSiloxane-1): In a multi-neck flask with nitrogen line, stirring device and internal thermometer, 175.30 g (1.37 mol) Methyl 5-Hexenoate (30 mol % excess) and 324.71 g (1.05 mol SiH) of an alpha,omega hydrogen siloxane (3.24 eq SiH/kg) were introduced and heated to 90° C. The addition of 30 wppm Karstedt catalyst initiates the hydrosilylation reaction. After 7 hours, no SiH could be found gas volumetrically. The product was distilled at 140° C. at <1 mbar for 4 hours to remove all volatile compounds and filtered yielding 460 g of a clear, slight yellow product.

alpha,omega-methylesterfunctional Siloxane (PrecursorSiloxane-1) (n=10, 0.807 mol —COOMe/kg, 486.18 g/mol, —COOMe Mw~873.60 g/mol (theory))

Transesterification of PrecursorSiloxane-1 (n=10) with Alpha,Omega-Hydroxyalkylfunctional Siloxane Tegomer H—Si 2115 (n=10):

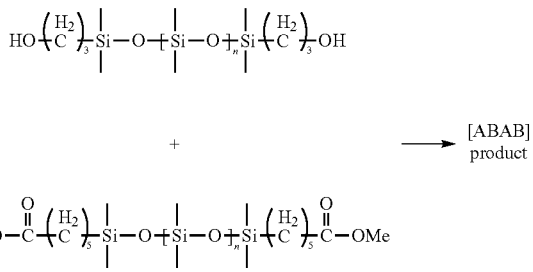

In a multi-neck flask with nitrogen line, stirring device and internal thermometer, 218.41 g alpha,omega-methylesterfunctional Siloxane "PrecursorSiloxane-1" (250 mmol=500 mmol —COOMe) and 206.43 g alpha,omega-hydroxyalkylfunctional Siloxane (250 mmol=500 mmol —(CH2)3OH) were introduced and heated to 90° C. In addition, 0.32 g Butyltitanate (0.075 wt. %) have been added and reaction mixture was heated under stirring to 200° C. for 8 hours. A slow nitrogen stripping promoted the boiling of methanol. To finalize the reaction, a vacuum of 10 mbar was applied for additional 6 hours.

A slightly yellow, at room temperature viscous polymer could be obtained.

GPC analysis for Example 4 Mw=62.003 g/mol, Mn=16.898, Đ$_M$=3.67

Example 5: Water Uptake and Film Loss in Artificial Seawater

Clear coat films of the poly(ester-siloxane) binders from example 2, 3 and 4 were cured using a isocyanate based cross-linker, 3-isocyanatopropyltrimethoxysilane, and dibutyltin dilaurate catalyst in xylene. Coating films were formed using a ratio of terminal hydroxyl group (binder) to isocyanate (crosslinker) of 1:1.5 (OH:NCO) with 0.1% (w/w) catalyst and 30% (w/w) xylene. Films were applied on glass test panels using a film applicator with 300 μm clearing. The water uptake and film loss in artificial seawater was studied over 30 days. A non-polishing reference ("PDMS reference") was prepared by curing a silanol-terminated PDMS 66% (w/w) (DMS-S33, Gelest) with ethyl silicate crosslinker 3% (w/w) (TES 40 WN, Wacker) using 1% (w/w) dibutyltin dilaurate catalyst in 30% (w/w) xylene. The non-polishing PDMS reference was chosen due to its resemblance to the binder systems used in classical commercial fouling release coatings.

TABLE 2

| Film binder | Water uptake after 30 days [% (w/w)] | Film loss after 30 days [% (w/w)] |
| --- | --- | --- |
| PDMS reference | 0.5 ± 0.2 | 0.7 ± 0.3 |
| Example 2 | 0.6 ± 0.1 | 3.1 ± 0.1 |
| Example 3 | 0.5 ± 0.2 | 4.7 ± 0.2 |
| Example 4 | 0.7 ± 0.3 | 1.7 ± 0.1 |

The results show that the coatings with poly(ester-siloxane) binders have a similar water uptake as the PDMS reference. Notably the example 2-4 coatings all have higher film loss after 30 days compared to the non-polishing PDMS reference.

Example 6: Coating Compositions

Six different coating compositions were prepared by mixing the components shown in Table 3. The first composition, "FRC reference", represents a typical foul-release coating composition. Coating 2-4 are similar compositions where the silanol terminated polydimethylsiloxane binder (non-hydrolysing) has been replaced by the poly(ester-siloxane)s of Example 2-4. Coating 5-6 are variants of coating 2 and 4 with addition of Copper Pyrithione biocide.

TABLE 3

|  | FRC reference [g] | Coating 2 [g] | Coating 3 [g] | Coating 4 [g] | Coating 5 [g] | Coating 6 [g] |
| --- | --- | --- | --- | --- | --- | --- |
| Part (i) | | | | | | |
| Polydimethylsiloxane, silanol terminated (1) | 55.2 | | | | | |
| Example 2, poly(ester-siloxane) | | 58.2 | | | 55.3 | |
| Example 3, poly(ester-siloxane) | | | 58.2 | | | |
| Example 4, poly(ester-siloxane) | | | | 58.2 | | 55.3 |
| Cu-Pyrithione | | | | | 3.9 | 3.9 |
| Hydrophobic silica (2) | 0.8 | 1.0 | 1.0 | 1.0 | 1.0 | 1.0 |
| Bayferrox Red 130M | 3.0 | 3.2 | 3.2 | 3.2 | 3.0 | 3.0 |
| Methylphenyl polysiloxane oil | 8.0 | 8.0 | 8.0 | 8.0 | 7.6 | 7.6 |
| Ether modified polysiloxane oil | 3.5 | 3.5 | 3.5 | 3.5 | 3.3 | 3.3 |
| Xylene | 19.5 | 16.1 | 16.1 | 16.1 | 15.9 | 15.9 |
| Total Part (i) | 90.0 | 90.0 | 90.0 | 90.0 | 90.0 | 90.0 |
| Part (ii) | | | | | | |
| Ethyl silicate (3) | 3.8 | | | | | |
| 3-isocyanatpropyl trimethoxysilane | | 3.4 | 2.5 | 2.4 | 3.2 | 2.3 |
| Dibutyltin dilaurate | 0.2 | 0.2 | 0.2 | 0.2 | 0.2 | 0.2 |
| Xylene | 2.1 | 2.5 | 3.4 | 3.5 | 2.7 | 3.6 |
| 2,4-Pentanedione | 3.9 | 3.9 | 3.9 | 3.9 | 3.9 | 3.9 |
| Total part (ii) | 10.0 | 10.0 | 10.0 | 10.0 | 10.0 | 10.0 |
| Total part (i) and (ii) | 100.0 | 100.0 | 100.0 | 100.0 | 100.0 | 100.0 |

(1) DMS-S33 (Gelest)
(2) Aerosil R972 (Evonik)™
(3) Wacker® TES 40 WN

Example 7: Polishing

The first four coating compositions in Table 3 (FRC reference, coating 2-4) were applied as radial stripes on a PVC disc using a film applicator of 300 μm clearance. The PVC disc had been pre-coated with one coat of Jotun Safeguard Universal ES primer and one coat of Jotun SeaLion tiecoat using airless spray within specified conditions. The test stripes were allowed to cure for a period of at least 24 h under ambient conditions before testing commenced. In Table 4 the polishing of the four compositions is presented. Each reading represents an average of three parallel stripes.

TABLE 4

| | Weeks since immersion | | | | |
| --- | --- | --- | --- | --- | --- |
| | 0 | 4 | 8 | 16 | 24 |
| | | | Polishing (μm) | | |
| FRC reference | 0 | 5.5 ± 0.3 | 6.8 ± 0.5 | 7.1 ± 1.1 | 7.3 ± 0.2 |
| Coating 2 | 0 | 8.6 ± 1.4 | 13.1 ± 0.6 | 25.7 ± 1.3 | 35.8 ± 3.3 |
| Coating 3 | 0 | 7.4 ± 1.7 | 11.4 ± 1.3 | 20.4 ± 3.5 | 31.7 ± 2.4 |
| Coating 4 | 0 | 3.1 ± 1.7 | 7.3 ± 1.7 | 11.4 ± 0.1 | 16.9 ± 1.0 |

The results show that all three formulations of this invention (Coating 2-4) experience continuous surface polishing and film thickness reduction over time. The FRC reference has a minor initial loss of film thickness after which it stabilizes without showing any signs of continuous polishing.

Example 8: Comparative Examples

Two comparative example binders, Comparative EG2 and Comparative EG4, were synthesised based on the lactone-siloxane-lactone ABA-triblock copolymers of patent application WO2015/082397A1 (Example EG2 and EG4, Table 1, p. 27);
Comparative EG2
In a multi-neck flask with nitrogen line, stirring device and internal thermometer, after initial nitrogen purging, 130 g Tegomer H—Si 2315 (n(OH)=0.1182 mol) and 240.5 g D,L-lactide (3,6-dimethyl-1,4-dioxane-2,5-dione) (n=1.6686 mol) were introduced and heated to 130-140° C. In addition, 0.34 g BorchiKat 28 (0.05 mol % of n(D,L-lactide)) was added and the reaction mixture was heated under stirring to 190° C. for 6 h. 100% bulk polymer was received as a slightly yellow solid by transferring the polymer melt to an aluminium plate. NMR spectroscopic analysis confirmed the desired polymer formation and especially the integrity of the siloxane backbone.
GPC data: Mw=10520 g/mol, Mn=2496 g/mol, $Ð_M$=4.12
Comparative EG4
In a multi-neck flask with nitrogen line, stirring device and internal thermometer, after initial nitrogen purging, 38.16 g Tegomer H—Si 2315 (n(OH)=0.0347 mol) and 350.0 g D,L-lactide (3,6-dimethyl-1,4-dioxane-2,5-dione) (n=2.428 mol) were introduced and heated to 130-140° C. In addition, 0.49 g BorchiKat 28 (0.05 mol % of n(D,L-lactide)) was added and the reaction mixture was heated under stirring to 190° C. for 6 h. 100% bulk polymer was received as a slightly brownish solid by transferring the polymer melt to an aluminium plate. NMR spectroscopic analysis confirmed the desired polymer formation and especially the integrity of the siloxane backbone.
GPC data: Mw=26164 g/mol, Mn=2677 g/mol, $Ð_M$=8.54
Furthermore, two comparative coating compositions, Comparative coating EG5 ('EG2 binder) and Comparative coating EG7 ('EG4 binder), were prepared by mixing according to formulations detailed in Example 5 and Example 7 of WO2015/082397A1 (Table 2, p. 29).

Example 9: DSC Measurements

In order to highlight the difference between the [ABAB]-type binders of this invention and the ABA-triblock comparative examples of WO2015/082397A1, DSC measurements were performed. Table 5 shows the glass transition temperatures (Tg) and theoretical PDMS content (versus organic content) for a typical binder of this invention (Example 2) along with the two comparative example binders.

TABLE 5

| | Theoretical PDMS content (%, w/w) | Tg (° C.) |
|---|---|---|
| Example 2 | 92 | −119.6 |
| Comparative EG 2 | 35 | 29.3 |
| Comparative EG 4 | 10 | 42.6 |

The results show that the Example 2 binder, with a PDMS content of about 92%, has a Tg of around −120° C. This is in the same range as the conventional PDMS binders used in classical FRC. The comparative examples EG 2 and EG4, with their relatively much lower PDMS contents (high organic content), have Tg of around 30-40° C. This is in the same range as typical acrylic binders used in conventional biocidal antifoulings.

Example 10: Antifouling Testing

The coating compositions of Example 6 (Coating 2-6 and FRC reference) were applied using a film applicator with a 300 μm clearance on PVC marine test panels. The panels had been pre-coated with one coat of Jotun Safeguard Universal ES primer and one coat of Jotun SeaLion tiecoat using airless spray within specified conditions. The comparative coatings EG5 and EG7 where applied using a film applicator with a 300 μm clearance to panels which were pre-coated with one coat of Jotun Safeguard Universal ES primer. A panel coated with the 'ES primer only was used as a negative control.
Antifouling Testing (1)
Test site: Sandefjord, Norway. Panels with dimensions of 20×40 cm were used for static testing on raft which were attached to frames and suspended vertically 0.5-1.5 m below the water surface. Fouling coverage was assessed according to four ecologically derived fouling categories: Slime (microfouling), Weed, Soft-bodied animal, and Hard-bodied animal. The panels were analysed by visual inspection for fouling coverage and coating integrity after eight weeks. Sponge cleaning was performed using a washing sponge and given a rating of 1-4 according to;
1. Fouling removed completely by single gentle stroke with sponge
2. Fouling removed completely by repeated gentle strokes with sponge
3. Fouling removed by repeated hard strokes with sponge
4. Fouling could not be removed after repeated hard strokes with sponge
The results are shown in the table below

TABLE 6

| Sandefjord 8 weeks | Slime fouling (%) | Weed fouling (%) | Soft fouling (%) | Hard fouling (%) | Total fouling (%) | Sponge clean (1-4) | Coating integrity |
|---|---|---|---|---|---|---|---|
| FRC reference | 20 | 0 | 0 | 0 | 20 | 1 | Good |
| Coating 2 | 5 | 0 | 0 | 0 | 5 | 1 | Good |
| Coating 4 | 10 | 0 | 0 | 0 | 10 | 1 | Good |
| Coating 5 | 0 | 0 | 0 | 0 | 0 | — | Good |
| Coating 6 | 0 | 0 | 0 | 0 | 0 | — | Good |
| Comparative coating EG5 | 85 | 0 | 5 | 0 | 90 | 2 | Good |
| Comparative coating EG7 | 70 | 0 | 10 | 0 | 80 | 3 | Poor* |
| Primer | 50 | 0 | 40 | 0 | 90 | 4 | Good |

*Coating showed severe blistering

This table shows that after 8 weeks of static immersion the coatings of this invention (coating 2, 4-6) show a fouling resistance which is better than the FRC reference, and much superior to the comparative example coatings. The integrity and ability to clean the coatings of this invention were also superior to the comparative coatings. The results show a particular excellent fouling resistance for the ester-siloxane coatings which contain both additive oils and biocide (Coating 5 and 6).
Antifouling Testing (2)
Test site: Batelle, Fla. (US). Panels with dimensions of 7.5×17 cm were used for dynamic rotor testing by attaching the coated panels to a rotary drum which was completely submerged and rotated at a rate of 7 knots (3.6 m/s) through the water. Fouling coverage was assessed according to four ecologically derived fouling categories: Slime (microfouling), Weed, Soft-bodied animal, and Hard-bodied animal. The panels were analysed by visual inspection for fouling coverage and coating integrity after 13 weeks. The results are shown in the table below;

TABLE 7

| Batelle 13 weeks | Slime fouling (%) | Weed fouling (%) | Soft fouling (%) | Hard fouling (%) | Total fouling (%) | Coating integrity |
|---|---|---|---|---|---|---|
| FRC reference | 60 | 20 | 0 | 0 | 80 | Good |
| Coating 2 | 15 | 10 | 0 | 0 | 25 | Good |
| Coating 3 | 10 | 10 | 0 | 0 | 20 | Good |
| Coating 4 | 10 | 20 | 0 | 0 | 30 | Good |
| Coating 5 | 5 | 5 | 0 | 0 | 10 | Good |
| Comparative coating EG5 | 20 | 30 | 0 | 0 | 50 | Good |
| Comparative coating EG7 | 20 | 40 | 0 | 0 | 60 | Poor* |
| Primer | 0 | 100 | 0 | 0 | 100 | Good |

*Coating showed severe blistering

This table shows that after 13 weeks of dynamic testing the coatings of this invention (coating 2-5) show a fouling resistance which is much better than the FRC reference, and superior to the comparative example coatings. The integrity of the coatings of this invention was also superior to the comparative coating EG7. The results show a particular excellent fouling resistance for the ester-siloxane coating which contains both additive oils and biocide (Coating 5).

The invention claimed is:
1. An anti-fouling or fouling release coating composition comprising a binder and a curing agent, wherein the anti-fouling coating composition further comprises at least one anti-fouling agent,
wherein the binder comprises the reaction product of at least one polysiloxane of general formula (A'):

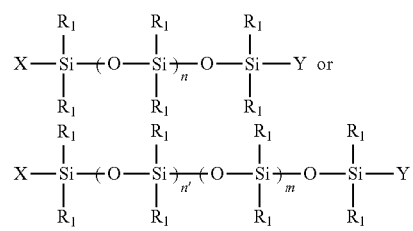

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y are the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$-OH;

R" is independently $C_{1-6}$ alkyl or H;

x' is 1 to 10;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500;

or n'+m add to 1-500;

and at least one second monomer B' selected from the group consisting of (i) monomers of formula:

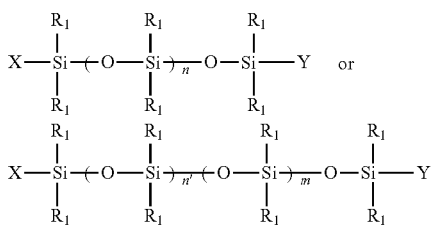

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y are the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$-OH;

R" is independently $C_{1-6}$ alkyl or H;

x' is 1 to 10;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500;

or n'+m add to 1-500 with the proviso that the X and Y groups in monomer B' are selected to react with the X and Y groups in polysiloxane A' to form a ester group;

and (ii) monomers of formula

W-Q-Z  B' wherein W and Z are each independently RcOOC, RcOCOO—, RcCOOCO, —COOH, or OH;

where Q is an aliphatic, cycloalkyl, cycloalkenyl, polyoxyalkylene, amine ether or aromatic group having up to 20 carbon atoms, or Q is -O- or a covalent bond and each Rc is the same or different and represents H, $C_{1-20}$ alkyl, $C_{2-20}$ alkenyl, $C_{6-20}$ aryl, $C_{3-20}$-cycloalkyl or $C_{7-20}$ arylalkyl group;

with the proviso that the W and Z groups in monomer B' are selected to react with the X and Y groups in polysiloxane A' to form a ester group; or (iii) at least one second monomer B' which is a cyclic anhydride which reacts with the X and Y groups in polysiloxane A' to form an ester, wherein A' and B' undergo a polymerization reaction to form a copolymer of structure -[ABAB]-.

2. An anti-fouling or fouling release coating composition comprising a binder and a curing agent, wherein the anti-fouling coating composition further comprises at least one anti-fouling agent, wherein the binder comprises the reaction product of at least one polysiloxane of general formula (A')

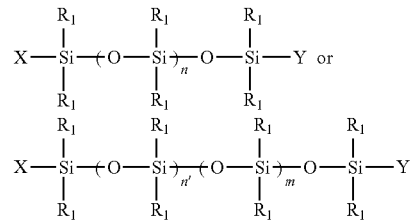

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y are the same or different and represent $(CR''_2)_{x'}$—OH, $(CR''_2)_x$COOH, $(CR''_2)_x$COOR, or —$(CR''_2)_{x'}$—$(OR^{11})_a$—$(OR^{11})_b$—OH;

R" is independently C1-6 alkyl or H;

x' is 1 to 10;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500;

or n'+m add to 1-500;

and at least one second monomer B' of formula

W-Q-Z  B' wherein W and Z are each independently RcOOC—, RcOCOO—, RcCOOCO, —COOH, or OH;

where Q is an aliphatic, cycloalkyl, cycloalkenyl, polyoxyalkylene, amine ether or aromatic group having up to 20 carbon atoms, or Q is -O- or a covalent bond and each Rc is the same or different and represents H, $C_{1-20}$ alkyl, $C_{2-20}$ alkenyl, $C_{6-20}$ aryl, $C_{3-20}$-cycloalkyl or $C_{7-20}$ arylalkyl group;

with the proviso that the W and Z groups in monomer B' are selected to react with the X and Y groups in polysiloxane A' to form a ester group.

3. An anti-fouling or fouling release coating composition comprising a binder and a curing agent, wherein the anti-fouling coating composition further comprises at least one anti-fouling agent, wherein the binder comprises the reaction product of at least one polysiloxane of general formula (A'):

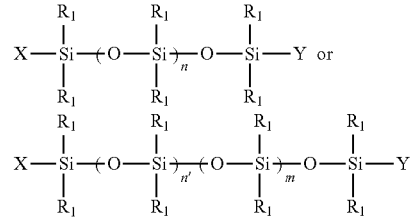

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

X and Y are the same or different and represent $(CR''_2)_{x'}$—OH, $(CR''_2)_{x'}$COOH, $(CR''_2)_{x'}$COOR, or —$(CR''_2)_{x'}$—$(OR^{11})_a$—$(OR^{11})_b$—OH;

R'' is independently C1-6 alkyl or H;

x' is 1 to 10;

R is $C_{1-20}$ alkyl, $C_{2-20}$ alkenyl, $C_{3-20}$ cycloalkyl, $C_{6-20}$ aryl, $C_{7-20}$ arylalkyl group;

$R^{11}$ are each independently $C_{2-6}$ alkylene;

a=0-50, b=0-50 and a+b=1-50; and n is 1-500;

or n'+m add to 1-500;

and at least one second monomer B' which is a dicarboxylic acid or dicarboxylic acid derivative, or a diol wherein the resulting polymer is of structure-[ABAB]- and with the proviso that the X and Y groups in polysiloxane A' react with monomer B' to form ester groups in the polymer backbone.

4. The coating composition of claim 1, wherein said polysiloxane A' is of formula

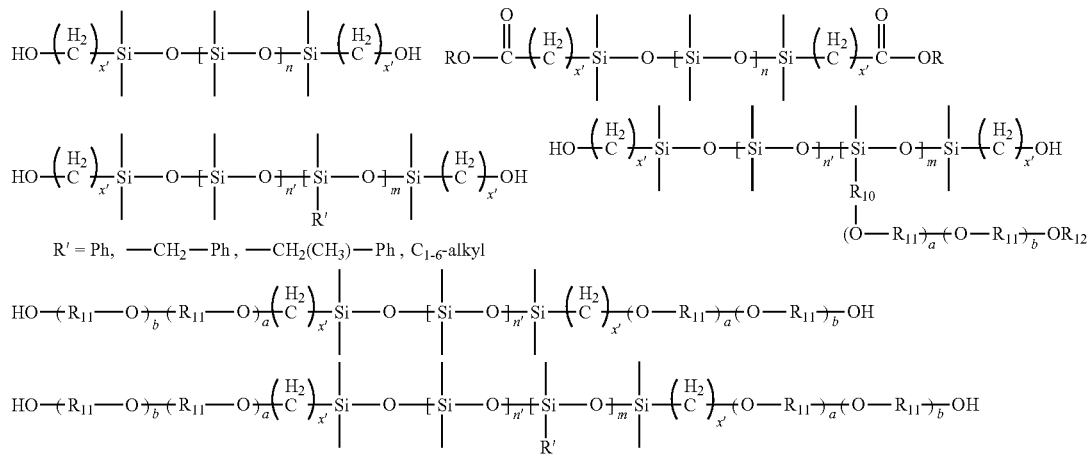

R' = Ph, —$CH_2$—Ph, —$CH_2(CH_3)$—Ph, $C_{1-6}$-alkyl

R is $C_{1-6}$ alkyl;

each $R_{10}$ and $R_{11}$ are independently $C_{2-6}$ alkylene;

a=0-50, b=0-50 and a+b =1-50; and n is 1-500;

or n'+m add to 1-500.

5. The coating composition of claim 1, wherein the polysiloxane A' is of formula (A''):

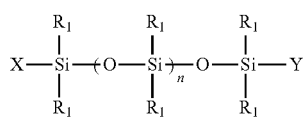

wherein each $R_1$ is methyl,

X and Y are the same and represent $(CH_2)_{x'}$—OH, —$(CH_2)_{x'}$—COOH, or —$(CH_2)_{x'}$—COOR;

x' is 1 to 10;

R is a $C_{1-20}$ alkyl group; and n is 10-300.

6. The coating composition of claim 1, wherein the polysiloxane A' is of formula (A2):

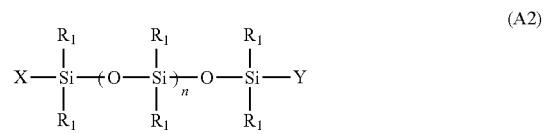

wherein each $R_1$ is methyl,

X and Y are the same and represent $(CH_2)_{x'}$—OH or —$(CH_2)_{x'}$—COOR;

x' is 1 to 10;

R is $C_{1-6}$ alkyl; and n is 10-300.

7. The coating composition of claim 1, wherein the polysiloxane A' is of formula (A3):

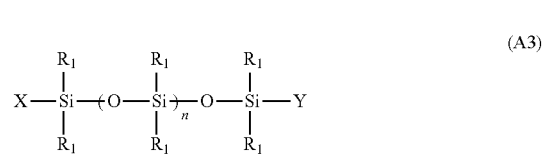

wherein each $R_1$ is methyl,

X and Y are the same and represent $(CH_2)_{x'}$—OH;

x' is 1 to 5; and n is 15-300.

8. The coating composition of claim 1, wherein the monomer B' is

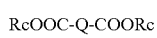

where Q is an aliphatic, cycloalkyl, cycloalkenyl, polyoxyalkylene or aromatic group having up to 20 carbon atoms or a covalent bond and each Rc is the same or different and represents H, $C_{1-20}$ alkyl, $C_{2-20}$ alkenyl, $C_{6-20}$ aryl, $C_{3-20}$ cycloalkyl group or $C_{7-20}$ arylalkyl group.

9. The coating composition of claim 1, wherein the monomer B' is

RcOOC-Q-COORc where Q is a $C_{1-6}$-alkylene group or Q is a covalent bond and each Rc is the same or different and represents H or $C_{1-20}$ alkyl.

10. The coating composition of claim 1, wherein the monomer B' is diethyl oxalate, diethyl succinate, dimethyl succinate, dimethyl glutarate, diethyl glutarate, dimethyl adipate, or diethyl adipate.

11. The coating composition of claim 1, wherein the monomer B' is

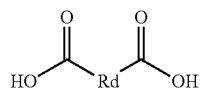
(B2)

wherein Rd is a saturated, unsaturated or aromatic $C_3$-$C_8$ ring, optionally comprising one or more heteroatoms selected from the group consisting of N, O and S.

12. The coating composition of claim 1, wherein the monomer B' is

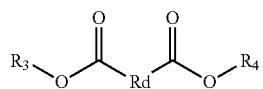
(B3)

wherein

Rd is a saturated, unsaturated or aromatic $C_3$-$C_8$ ring, optionally comprising one or more heteroatoms selected from the group consisting of N, O and S; and $R_3$ and $R_4$ in Formula (B3) are each independently a straight or branched chain $C_{1-20}$ alkyl group, a straight or branched chain $C_{2-10}$ alkenyl group a $C_{6-20}$ aryl group, a $C_{7-20}$ arylalkyl group; and a $C_{3-20}$cycloalkyl group.

13. The coating composition of claim 1, wherein the monomer B' is

HO-Q-OH diol where Q is an aliphatic, polyoxyalkylene, cycloalkyl, cycloalkenyl or aromatic group having up to 20 carbon atoms or a covalent bond.

14. The coating composition of claim 1, wherein the monomer B' is of formula

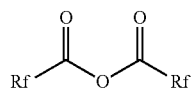
(B4)

where Rf is a C1-6 alkyl or two Rfs taken together form a ring.

15. The coating composition of claim 1, wherein polysiloxane A' is a polydimethylsiloxane.

16. The coating composition of claim 1, wherein monomer B' is a polydimethylsiloxane.

17. The coating composition of claim 1, wherein the polysiloxane B' is of formula (B2):

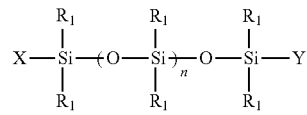
(B2)

wherein each $R_1$ is methyl,

X and Y are the same and represent $(CH_2)_{x'}$—OH or —$(CH_2)_{x'}$—COOR;

x' is 1 to 5;

R is $C_{1-6}$ alkyl; and n is 10-300.

18. The coating composition of claim 1, wherein X and Y are the same and represent $(CH_2)_{x'}$—OH, $(CH_2)_x$COOH, $(CH_2)_x$COOR, or —$(CH_2)_{x'}$—$(OR^{11})_a$—$(OR^{11})_b$—OH.

19. The coating composition of claim 1, wherein X and/or Y are a carbinol or X and/or Y are $(CH_2)_x$COOH or $(CH_2)_x$COOR.

20. The coating composition of claim 1, wherein the copolymer backbone contains a polyoxyalkylene or copolymers thereof.

21. The coating composition of claim 1, wherein W and Z are the same.

22. The coating composition of claim 1, wherein X and Y are the same.

23. The coating composition of claim 1 formed by the reaction of

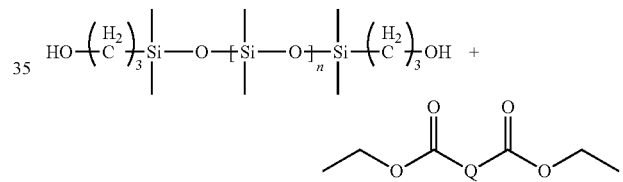

where Q is a covalent bond, ethylene or n-butylene group; or by the reaction of

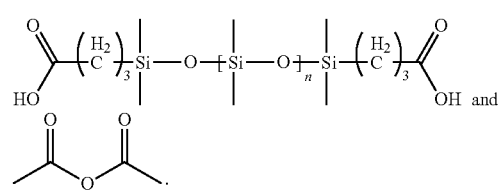

24. The coating composition of claim 1, wherein said binder is an ABAB type polysiloxane copolymer comprising a plurality of units of formula

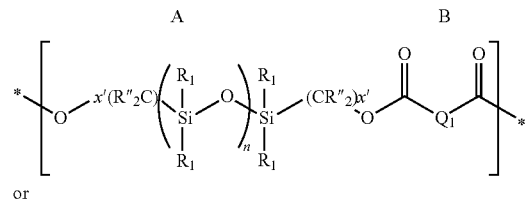

or

-continued

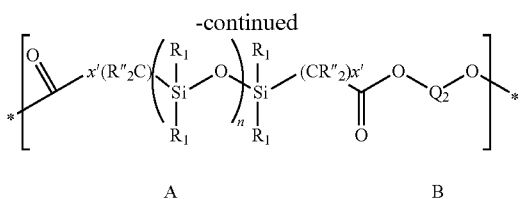

wherein each $R_1$ is the same or different and represents an unsubstituted or substituted $C_{1-20}$ alkyl, $C_{2-20}$ alkenyl, $C_{3-20}$ cycloalkyl, $C_{6-20}$ aryl, $C_{7-20}$ arylalkyl group, or a polyoxyalkylene chain;

R" is independently $C_{1-6}$ alkyl or H;

x' is 1 to 10; and n is 1-500; and where Q1 is an aliphatic, cycloalkyl, cycloalkenyl or aromatic group having up to 20 carbon atoms, or a covalent bond; and Q2 is an aliphatic, cycloalkyl, cycloalkenyl, polyoxyalkylene or aromatic group having up to 20 carbon atoms.

25. The anti-fouling coating composition as claimed in claim 1 further comprising at least one additive oil.

26. A process for protecting a metallic object from fouling comprising coating at least a part of said object which is subject to fouling with a coating composition of claim 1.

27. A metallic object coated with a cured coating composition of claim 1.

28. A process for protecting a metallic object from fouling comprising coating at least a part of said object which is subject to fouling with a coating composition of claim 2.

29. A metallic object coated with a cured coating composition of claim 2.

30. A process for protecting a metallic object from fouling comprising coating at least a part of said object which is subject to fouling with a coating composition of claim 3.

31. A metallic object coated with a cured coating composition of claim 3.

* * * * *